United States Patent [19]
Kondo

[11] 3,729,610
[45] Apr. 24, 1973

[54] ELECTRICAL DISCHARGE MACHINING DEVICE USING LOGICAL CONTROL

[76] Inventor: Iwao Kondo, 39-9-Kita-machi 1-chome, Tokyo, Japan

[22] Filed: Nov. 22, 1971

[21] Appl. No.: 200,773

Related U.S. Application Data

[63] Continuation-in-part of Ser. No. 9,566, Feb. 9, 1969, Pat. No. 3,632,942.

[30] Foreign Application Priority Data

| Feb. 7, 1969 | Japan | 45/9554 |
| Feb. 7, 1969 | Japan | 45/9555 |
| June 11, 1969 | Japan | 45/46422 |
| June 11, 1969 | Japan | 45/46423 |
| June 11, 1969 | Japan | 45/46424 |
| July 24, 1969 | Japan | 45/58503 |
| Oct. 2, 1969 | Japan | 45/78754 |

[52] U.S. Cl. ................................................219/69 C
[51] Int. Cl. ..................................................B23p 1/08
[58] Field of Search ..............219/69 C, 69 G, 69 P, 219/69 R, 69 S, 69 V

[56] References Cited

UNITED STATES PATENTS

| 3,590,205 | 6/1971 | Syria et al. | 219/69 G |
| 3,604,885 | 9/1971 | Inoue | 219/69 P |

*Primary Examiner*—R. F. Staubly
*Attorney*—Eric H. Waters et al.

[57] ABSTRACT

An automatic electrical discharge machining device, including a logic circuit and detecting units monitoring voltages and currents at different parts of the machining device circuit. The detecting units deliver their outputs to the logic circuit, for determining the short-circuit, large gap conductance, sustained arcing, and other detrimental conditions at the discharge gap, by suitably combining the outputs from the detecting units. Automatic control is made in response to the output from the logic circuit for regulating an electrode or various voltage pulses.

9 Claims, 34 Drawing Figures

Patented April 24, 1973  3,729,610

Patented April 24, 1973     3,729,610

Patented April 24, 1973 3,729,610

Patented April 24, 1973  3,729,610

ELECTRICAL DISCHARGE MACHINING DEVICE USING LOGICAL CONTROL

This application is a continuation-in-part application of Ser. No. 9566, filed Feb. 9, 1969; now U.S. Pat. No. 3,632,942; issued Jan. 4, 1972.

This invention relates to an electrical discharge machining device using logical control, and more particularly to an automatic electrical discharge machining device including a logical control circuit for detecting the machining conditions and generating control signals corresponding to the machining conditions thus detected, so that the electrical discharge machining device can automatically be controlled in response to the control signals.

An object of the present invention is to provide an improved electrical discharge machining device, with which skilled labor needs may be reduced while providing an efficient machining operation.

Conventional electrical discharge machining devices require the judgment of skilled operators for selecting proper operative conditions; namely, duration of machining currents, timing of withdrawing electrodes, and the withdrawing speed of the electrodes. Furthermore, according to conventional practice, the physical condition of the discharge gap or distance between an electrode and a workpiece has to be judged by each operator, based on his past experiences. Accordingly, the success of operation of the known electrical discharge machining devices largely depends on the experience and skill of the operator.

Thus, there has been proven to exist a need for an automatic control means for electrical discharge machining device, which automatically monitors the machining conditions and controls the machining device in response to the conditions thus detected. To this end, first of all, the conditions of each discharge gap must be accurately detected. Such discharge gap conditions include the following factors.

1. Whether there is or is not a discharge present.
2. If there is a discharge, whether the discharge is stable or unstable.
3. Whether there is or is not a substantial conductivity across the discharge gap between an electrode and a workpiece (to be referred to as "gap conductance" hereinafter), which gap conductance is generated by carbon particles formed by the decomposition of machining liquid and which is accumulated in the discharge gap.
4. Whether or not the discharge current is in such a condition as to be ready to become a stable arc discharge.
5. Whether or not the discharge gap is short-circuited.
6. Whether or not the mean voltage across the discharge gap is kept adequate even when the duty factors etc. are changed.

Among the above listed, the factors 1), 5), and 6) can be readily detected by measuring the mean voltage across the discharge gap and thus they are controllable. The factors 2), 3), and 4) are, however, not separately detectable by conventional means. More particularly, it is difficult to judge only from the difference in the mean voltage whether the discharge is stable or not and whether there is or is not a stable arc across the discharge gap, because such factors depend on the physical conditions of the discharge gap. It is well known in the art of electrical discharge machining that a stable arc across a discharge gap does not cause effective machining but roughens the surface of the object being machined.

The conditions of arcing across the discharge gap will now be described. When the insulation of the discharge gap is broken for machining, there are produced transient arcing conditions. An arc column is generated where an arc discharge takes place. The machining liquid around the arc column acts to cool the arc column and tends to recover the insulation by encircling the arc column. The high temperature of the arc column decomposes the machining liquid into gaseous substances and carbon particles, so as to generate pressure waves. The carbon particles thus generated are apt to produce the gap conductance.

Those portions of the electrode surfaces, where such transient arcing takes place, are sufficiently heated for emission of thermoelectrons, so as to form a cathode spot and an anode spot. As the discharge current diminishes, the plasma constituting the arc column is cooled by the surrounding machining liquid and decomposition products, and it is changed to an aggregate of neutral molecules. At the sametime, the cathode spot and the anode spot are cooled, and cease to emit the thermoelectrons. Thus, the insulation across the discharge gap is normally recovered at the end of each discharge.

If, however, the intensity of the discharge increases and the non-discharge period $(T-\tau)$ ($T$ being the period of the periodic discharge and $\tau$ being the duration of each discharge) becomes too short, the next machining voltage pulse will be applied across the discharge gap before the recovery of the insulation of the discharge gap. In this case, the discharge across the gap is sustained without experiencing the breakthrough of the insulation across the gap. In other words, if the cathode spot and the anode spot are not sufficiently cooled, the application of the machining voltage will directly cause a sustained stable arc without passing the normal sequence of (insulated condition — (application of machining voltage pulse — (insulation breakthrough) — (transient arcing).

In order to prevent the formation of such a sustained stable arc, conventional electrical discharge machining devices generally use cooling means in forcibly supplying the machining solution. Such forced supply of the machining liquid, however, has a shortcoming in that it accelerates the consumption of the electrode, and particularly when a large amount of high-pressure machining liquid is supplied to the discharge gap under certain machining conditions, the electrode is quickly consumed. The maching operation which normally consumes only a minor portion of the electrode is susceptible to such quick electrode consumption due to the forced supply of the machining liquid.

Accordingly, in an electrical discharge machining device, which is designed for the low consumption of the electrode, it is desirable to take the following measures by accurately detecting the arcing conditions during the machining operation;

a. To move the electrode away from the workpiece.
b. To reduce the duty factor $(\tau/T)$.
c. To raise the mean machining voltage, by using a servo mechanism.

d. To increase the rate of machining liquid supply only when there is a sustained arc.
e. To vibrate the electrode.
f. To reduce the machining current.
g. To increase the non-discharge period.
h. To reduce the pulse duration.

Therefore, an object of the present invention is to provide an improved automatic electrical discharge machining device which satisfies the aforesaid requirements.

Other objects and advantages of the present invention may be appreciated by referring to the following description, taken in conjunction with the accompanying drawings, in which.

Like parts are designated by like numerals throughout the drawings.

In one aspect of the present invention, the gap conductance is measured during the machining operation, for generating control signals for automatically controlling the electrode. It is, of course, possible to measure the gap conductance by interrupting the machining operation for a period of time. With such a method, however, not only the machining operation is interrupted, but also the gap conductance itself is changed depending on the time after the interruption of the machining operation, because the insulation across the discharge gap between an electrode and a workpiece gradually recovers immediately after the interruption. Thus, the method for measuring the gap conductance by interrupting the machining current is not suitable for the purpose of the present invention.

Figure 1:
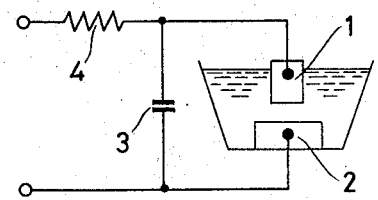
FIGS. 1 and 2 are schematic diagrams of conventional impulse circuits of dependent type electrical discharge machining devices.
Figure 2:
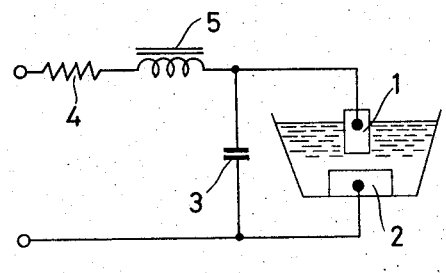
Figure 3:
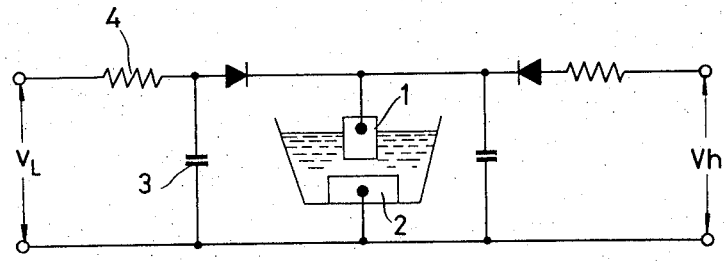
FIG. 3 is a schematic diagram of a circuit in which a high-voltage circuit for breaking through the discharge gap insulation is added to the circuit of FIGS. 1 or 2.

The measurement of the gap conductance during the machining operation has proven to be difficult in any of the conventional dependent type electrical machining devices, as illustrated in FIGS. 1 to 3. In the circuit of FIG. 1, a charge-discharge capacitor 3 is connected across a series circuit consisting of an electrode 1 and a workpiece 2. In the circuit of FIG. 2, a charging circuit includes a current-limiting resistor 4 and an inductor 5 which are connected in series. A high-voltage $v_h$ is superimposed in the circuit of FIG. 3. In the circuits of FIGS. 1 to 3, the current caused by the discharge is hardly distinguishable from a current depending on the gap conductance.

There are two difficulties which are encountered in the measurement of the gap conductance during the machining operation. In the circuits of FIGS. 1 and 2 having only one current path, mere measurement of the magnitudes of such currents is not sufficient for distinguishing the normal discharge current from the current depending on the gap conductance. In the circuit of FIG. 3, although the power sources for the high-voltage to be superimposed and the low-voltage are separated, the presence of the charge-discharge capacitor across the discharge gap makes it difficult to distinguish the discharge current from the gap conductance depending current based on quantities other than magnitudes of such currents.

The inventor has noticed the fact that (1) the impulse waveform during the normal machining operation with alternating charging and discharging is approximately triangular and includes a considerably large AC component, and that (2) upon the generation of the gap conductance, the voltage across the gap diminishes, because a current flow leaks through, although there is not any discharge therethrough, so that the voltage waveform becomes close to a DC voltage and its AC component becomes smaller.

Therefore, an object of the present invention is to provide a means for measuring the gap conductance of an electrical discharge machining device during the operation, by separately detecting the current through the discharge gap, the DC component of the voltage across the discharge gap or between the electrode and the workpiece, and the AC component of the voltage across the discharge gap, and suitably combining the output signals from the three separate detecting circuits in a logic circuit.

Figure 4:
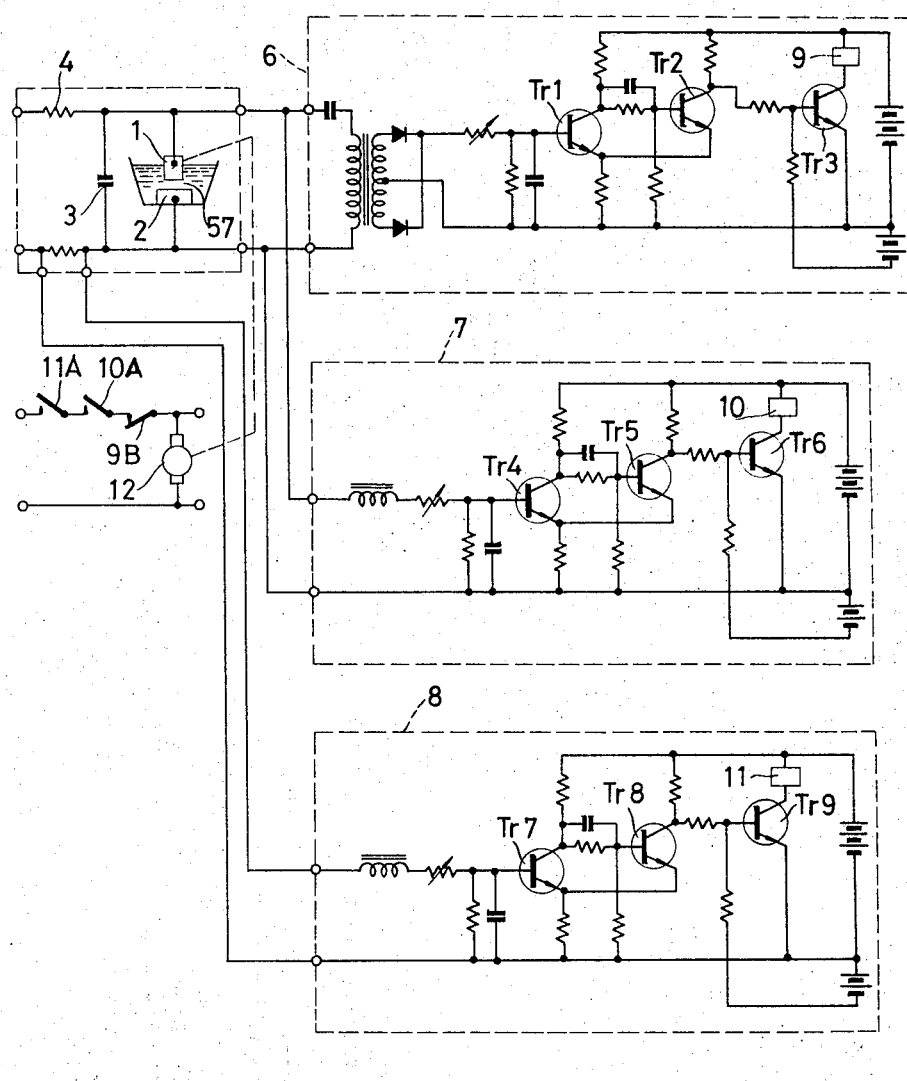
FIG. 4 is a circuit diagram of an electrical discharge machining device, according to the present invention.

FIG. 4 shows an embodiment of the present invention. In the figure, Schmitt circuits are used for an AC-component detecting circuit 6, a DC-component detecting circuit 7, and a current detecting circuit 8 which monitors the machining current. Relays 9 to 11 are connected to the outputs from the circuits 6 to 8, respectively, and relay contacts 9B, 10A, and 11A of such relays are inserted, in series, in a servo circuit for controlling the electrode of the electrical discharge machining device. Here, the contact 9B is normally closed, namely closed when the relay 9 is de-energized; the contact 10A is normally open, namely open when the relay 10 is de-energized; and the contact 11A is also normally open, namely open when the relay 11 is de-energized. The series-connected contacts 9B, 10A, and 11A constitute a kind of logic circuit, namely an AND circuit.

Table I shows the variation of the current, the DC-component, and the AC-component for different operative conditions of the electrical discharge machining device. When the electrode is retarded and a considerably large gap conductance is generated, the AC-component is small while the DC-component and the current have some finite values, respectively.

TABLE I

| Gap condition | AC-component | DC-component | DC current |
|---|---|---|---|
| Short-circuit | None (low) | None (low) | Exists (high) |
| When gap conductance is generated. (with electrode retarded) | None (low) | Exists (high) | Exists (high) |
| Insulated (with no discharge) | None (low) | Exists (high) | None (low) |
| Normal machining | Exists (high) | Exists (high) | Exists (high) |

When a finite gap conductance is generated, the AC-component in the circuit 6 is small, and transistors $Tr1$ and $Tr3$ in the circuit are turned off, with a transistor $Tr2$ being kept on, and the relay 9 is de-energized to keep the contact 9B as closed. Since DC-component of the voltage and DC current exist in the circuits 7 and 8, the transistor operation is reversed; namely, $Tr4$ and $Tr6$ are turned on, while $Tr5$ is turned off in the DC-component detecting circuit 7; and $Tr7$ and $Tr9$ are turned on, while $Tr8$ is turned off in the current detecting circuit 8. Accordingly, the relays 10 and 11 are energized, to close the contacts 10A and 11A, respectively. As a result, the servocircuit for controlling the electrode is closed, to actuate a servo motor 12 for retarding the electrode 1 from the workpiece 2. When the insulation is recovered at the discharge gap 57 upon the retardation of the electrode 1 from the workpiece 2, the DC current diminishes, so as to de-energize the relay 10 of the current detecting circuit 8, by turn off of the transistors $Tr7$ and $Tr9$, while turn on of the transistor $Tr8$. Thus, the contact 10A opens to stop the servomotor 12 for ceasing the movement of the electrode 1.

The invention is not limited to use of the servomotor 12, but any other suitable servo mechanism can be used for controlling the movement of the electrode 1, for instance, a hydraulic valve means can be used in lieu of the motor 12 with aid of appropriate solenoid valve means.

According to the present invention, the gap conductance can be detected during the operation of an electrical discharge machining device, by separately measuring the AC- and DC-components of the voltage across the discharge gap and the current therethrough, and applying the output signals from the circuits measuring such quantities to the logic circuit. Furthermore, the machining operation can be efficiently controlled by regulating the servo circuit in response to the output from the logic circuit, for controlling the movement of the electrode. Thus, the electrical discharge machining operation can be automated. As a result, the need of experienced operator is greatly reduced, if not completely eliminated.

Figure 5:
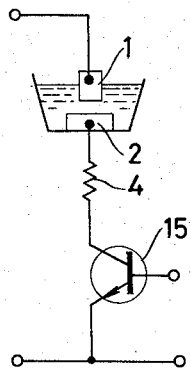
FIG. 5 is a schematic diagram of the impulse circuit of an independent type electrical discharge machining device.

In the case of an independent type impulse circuit, as shown in FIG. 5, an electrode 1, a workpiece 2, a current-limiting resistor 4, and a switching element 15 are connected in series to a power source. Accordingly, it has been difficult to distinguish the discharge current through the discharge gap from a current caused by the gap conductance, by using conventional means, as pointed out in the foregoing.

Figure 6:
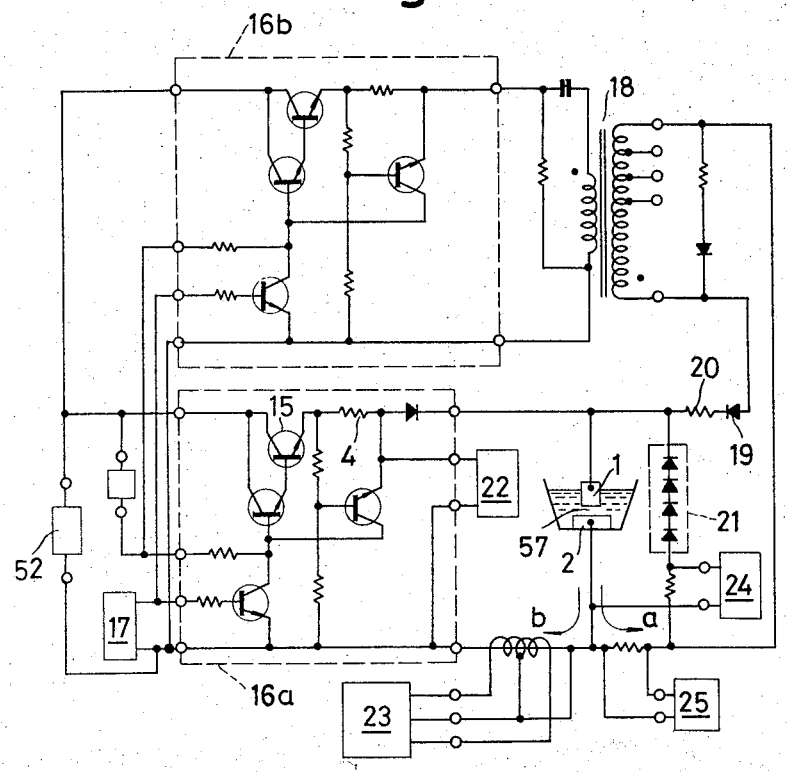
FIG. 6 is an electric circuit diagram of a discharge machining device, according to the present invention with a source of high-voltage pulses for breaking through the insulation of a discharge gap.

FIG. 6 shows an independent type electrical discharge machining device, which incorporates an impulse circuit for superimposing high-voltage pulses breaking and leaking through the insulation of the discharge gap 57. In the figure, DC switching circuits 16a and 16b are driven by one pulse-generator 17, so that the output signals from the switching circuits 16a and 16b are always in synchronism with each other or they are in phase. The output from the switching circuit 16a is directly applied to the discharge gap 57 between the electrode 1 and the workpiece 2. On the other hand, the output from the switching circuit 16b is stepped up by a transformer 18, and then applied to the discharge gap 57 through a high-voltage rectifier 19 and a resistor 20. A constant-voltage diode 21 is connected across the discharge gap 57, for preventing the voltage-rise at the discharge gap in excess of a given insulation breakthrough voltage.

The inventor has noticed the fact that the distribution of the voltages and currents in the circuit of the independent type electrical discharge machining device of FIG. 6 varies depending on the conditions at the discharge gap; namely, whether there is a gap conductance, or whether the gap is insulated, short-circuited, or carries a machining current. Table II shows such variation of the currents and voltages for different conditions across the discharge gap.

TABLE II

| Gap condition | High voltage (for insulation breakthrough) | Current on the high-voltage side | Low voltage | Current on the low-voltage side |
|---|---|---|---|---|
| Not discharging (insulated) | Exists (high) | None (low) | Exists (high) | None (low) |
| Normal machining | None (low) | Exists (high) | Exists (high) | Exists (high) |
| With gap conductance | None (low) | Exists (high) | Exists (high) | None (low) |
| Short-circuited | None (low) | Exists (high) | None (low) | Exists (high) |

According to an aspect of the present invention, separate measurements will be made on the high voltage applied to the discharge gap for insulation breakthrough, the low-voltage across the discharge gap for machining operation, the small-current through the discharge gap for insulation breakthrough or leakthrough, and the large current through the discharge gap for machining. The response to such measurements are applied to the logic circuit, for detecting the presence of the gap conductance, based on the relation in Table II.

Figure 7:
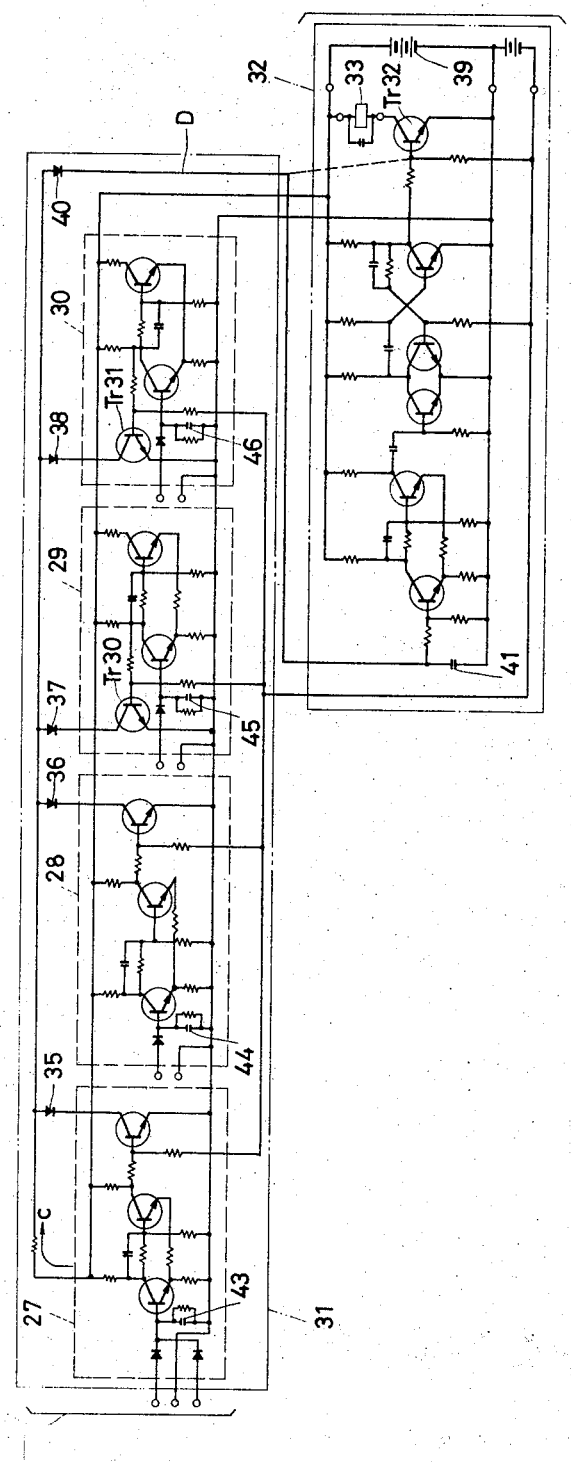
FIG. 7 is an electric schematic diagram of a logic circuit for detecting the gap conductance.

In the circuit of FIG. 6, four separate circuits are provided for the aforesaid measurement; namely, a low-voltage detecting circuit 22, a large-current detecting circuit 23, a high-voltage detecting circuit 24, and a small-current detecting circuit 25. The low-voltage and the large current are for the machining operation, and the high-voltage and the small-current are for insulation breakthrough. The outputs from the four detecting circuits are applied to a logic circuit 26, as shown in FIG. 7, which comprises an OR circuit 31 including four Schmitt circuits 27–30 and a timer circuit 32 for delaying. The timer circuit 32 also includes a switching relay 33 for regulating a servo system (not shown) for controlling the electrode.

When there is generated a substantial gap conductance, the discharge through the discharge gap becomes difficult. At the same time, the current from the high-voltage side flows through the discharge gap in a direction as shown by the arrow $a$ in FIG. 6. Thus, the voltage across the constant-voltage diode 21 diminishes, and the high-voltage detecting circuit 24 is turned off, while the small-current detecting circuit 25 is turned on. Then, the machining circuit does not provide any current, because the resistance of the discharge gap is high, and the low-voltage for the machining appears across the discharge gap, so that the low-voltage detecting circuit 22 is turned on, while the large-current detecting circuit 23 is turned off.

The constant-voltage diode 21 can be a varistor made of silicon carbide. The high-voltage can be measured directly across the discharge gap, instead of using the high-voltage detecting circuit 24 of FIG. 6.

When the detecting circuits 22 to 25 respond to the generation of gap conductance, as described above, only the Schmitt circuits 29 and 30 of the logic circuit 26, which receives output from the detecting circuits 22 to 25, are reversed. As a result, transistors $Tr30$ and $Tr31$ are turned off, so that all diodes 35 to 38 are made non-conductive. Thus, a power source 39 feeds an electric current in a direction of the arrow $c$ in FIG. 7, for charging a capacitor 41 through a diode 40. As the voltage across the capacitor 41 increases to a preset value, the timer circuit 32 is actuated to energize the timer relay 33 for a given period of time, so that a servo system (not shown) is operated for retarding the electrode 1 away from the workpiece 2. When the insulation of the discharge gap recovers in response to the retardation of the electrode 1 away from the workpiece 2, the currents through the discharge gap disappear and high and low-voltages appear across the discharge gap. Thereby, the detecting circuits 22 and 24 are turned on, but the detecting circuits 23 and 25 are turned off. Thus, the relay 33 is de-energized, to cease the movement of the electrode 1. As pointed out in the foregoing, the retardation of the electrode 1 can be effected by any suitable means, for instance by a servo motor.

As described in the foregoing disclosure, the presence of the gap conductance in an independent type electrical discharge machining device can be detected during the operation of the device, by detecting four quantities of the device during the operation and applying the outcome of the detection to the logic circuit for the determination of the presence of the gap conductance. The four quantities include the high-voltage across the discharge gap for insulation breakthrough, the low-voltage across the discharge gap for the machining operation, the small-current through the discharge gap for insulation breakthrough, and the large-current through the discharge gap for the machining operation. By controlling the movement of the electrode in response to the detection of the gap conductance through a suitable means, e.g., a servo motor, the operation of the electrical discharge machining device of independent type can be automated. As a result the need to use experienced operators is greatly reduced.

Alternately, the timer circuit 32 can be eliminated from the logic circuit 26, by using the output from the pulse generator 17 as a power source of the OR circuit 31, instead of the separate power source 39. In this case, the signal at the output terminal D of the OR circuit 31 is applied to a transistor $Tr32$ for amplification, as shown by dotted lines in FIG. 7. When the gap conductance larger than a predetermined value is present, the relay 33 can be energized in synchronism with the pulse generator 17 by each pulse from the pulse generator 17 for effecting the aforesaid electrode control. In this case, the capacitors 43 to 46 in FIG. 7 can be dispensed with. The relay 33 is not limited to a conventional moving contact type, but any contactless relays, e.g., suitable transistors, can also be used in the device of the present invention.

Figure 8:
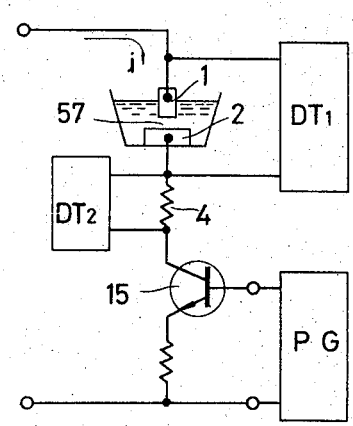
FIG. 8 is a schematic diagram, illustrating the operative principles of an independent type electrical discharge machining device using impulses.
Figure 10:
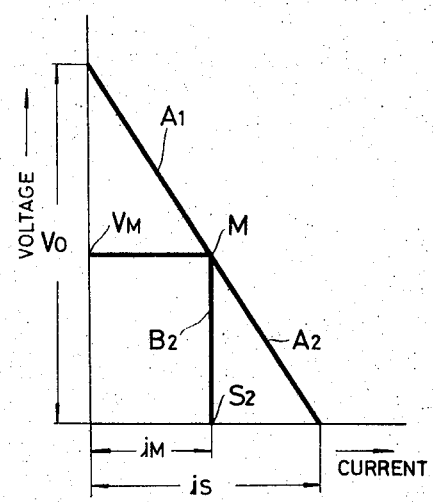
FIG. 10 is a graph, illustrating the load characteristics of the devices of FIGS. 8 and 9.

FIG. 8 illustrates an electrical discharge machining device using a transistor chopper circuit (independent type), which is disclosed by Ulmann and Growelt in their Japanese Pat. application opened for public inspection under the number of 9,399/1966. In the figure, a DC current through the discharge gap 57 between an electrode 1 and a workpiece 2 is switched by applying impulses from a pulse generator PG to the base of a switching transistor 15. The load characteristics of the circuit of FIG. 8, including a series-circuit having a current-limiting resistor 4, the electrode 1 and the workpiece 2, are linear, as shown by Curves $A_1$ and $A_2$ of FIG. 10.

Accordingly, the mean voltage and the peak voltage across the discharge gap 57 between the electrode 1 and the workpiece 2 are inversely proportional to the magnitude of the machining current. In other words, there is a linear relation between the voltage across the discharge gap and the current therethrough. Thus, it is impossible to control the electrode 1 merely by detecting the voltage across the discharge gap 57.

Figure 9:
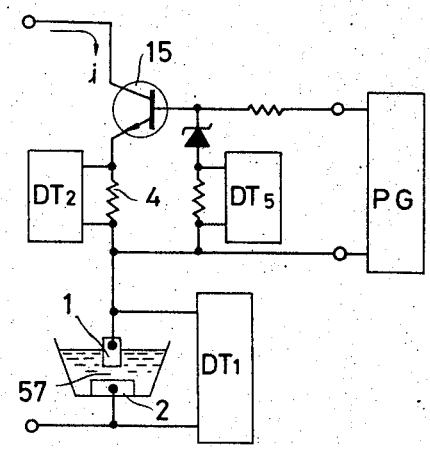
FIG. 9 is a schematic diagram, illustrating a circuit similar to FIG. 8 which includes a means for constant current.

In another electrical discharge machining device, as shown in FIG. 9, a transistor switching circuit is used, wherein constant-current pulses are applied across the discharge gap 57. The load characteristics of the circuit of FIG. 9 are represented by Curves $A_1$ and $B_2$ of FIG. 10. With the bent-line characteristics of FIG. 10, the relation between the voltage across the discharge gap 57 and the current therethrough can be assumed to be rectilinear. Accordingly, the discharge gap 57 can be controlled by detecting the voltage across the discharge gap 57, without causing any significant detrimental effects. If, however, the circuit of FIG. 9 is operated in the proximity of the point $S_2$ of FIG. 10 for an extended period of time, the switching transistor 15 is likely to be burned down or evaporated.

Figure 11:
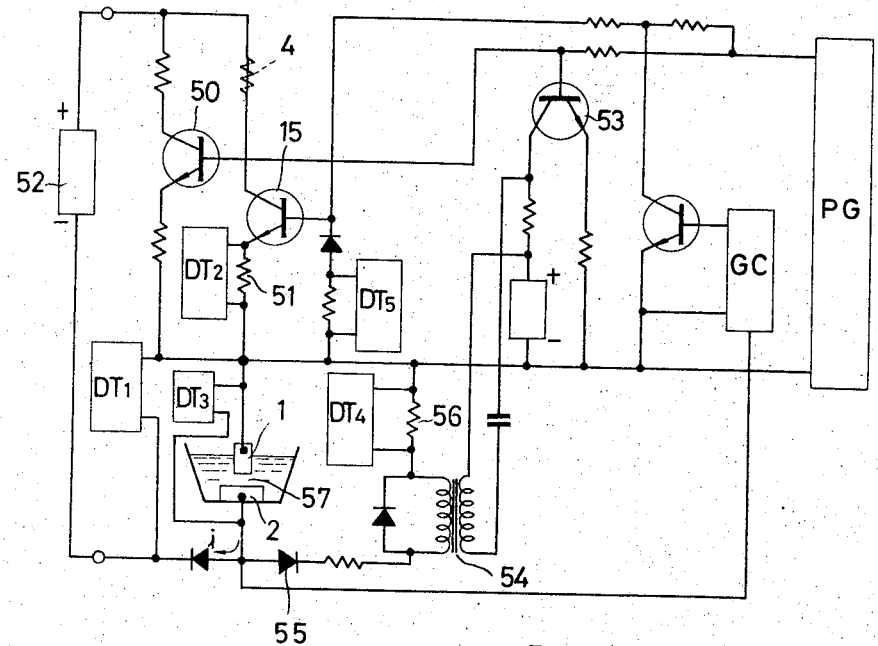
FIGS. 11 and 12 are circuit diagrams of two different electrical discharge machining devices, according to the present invention.

In order to mitigate such difficulties, the inventor has proposed to insert an auxiliary switching element or transistor 50 in addition to a conventional switching transistor 15, which is connected in series with an electrode 1 and a workpiece 2, as shown in FIG. 11. When the machining current $i$ of the device reaches a predetermined value (point P of FIG. 13), only the auxiliary switching transistor is made conductive for limiting the current by a resistor in the circuit of the auxiliary transistor, so as to shift the operating point from the point P to the point Q. Thereafter, the machining current $i$ varies along the line $F_2$ of the load characteristics $F_1$ and $F_2$ of FIG. 13. The discharge gap 57 is short-circuited at the point $S_2$ of FIG. 13.

The arc drop across the discharge gap 57 during the discharge is rather low, i.e. about 20 volts to 30 volts. Accordingly, if the current-limiting resistor 4 in series with the switching element 15 can be dispensed with, the voltage (arc drop) + (voltage drop across the resistor 51) + (voltage drop across the switching element 15) becomes the output voltage $V_{o2}$ of the power source 52 (FIGS. 11 and 13), which is lower than the corresponding voltage in the circuit of FIG. 9. The voltage $V_{o2}$ is about 40 volts to about 50 volts. Since such a comparatively low voltage is not sufficient for breaking through the insulation across the discharge gap 57, a high-voltage-generating circuit consisting of a transistor 53, a transformer 54, and a diode 55 is provided for the purpose of generating a high voltage for insulation breakthrough, which is equal to the power source voltage $V_0$ or higher. (Curve $A_4$ of FIG. 13).

Figure 13:
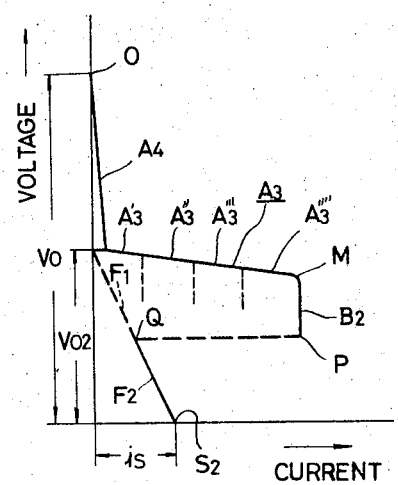
FIGS. 13 and 14 are graphs, showing the load characteristics of the devices of FIGS. 11 and 12, respectively.

The load characteristics of the circuit of FIG. 11 is not rectilinear, as shown in FIG. 13. Accordingly, the detection of the voltage across the discharge gap 57 is not enough for effective control of the electrode 1 relative to the workpiece 2.

In order to effect automatic control of the electrode in the circuit of FIG. 11, it is necessary to accurately detect at which portion of the load characteristics the machining device is in operation, in addition to the detection of the voltage across the discharge gap 57. In other words, the knowledge on the accurage operation of the machining device, with respect to its load characteristics, will enable the proper control of the moving direction and speed of the electrode 1 and the feeding of the machining liquid.

According to one aspect of the present invention, certain potentials and currents in the machining device of FIG. 11 are separatedly measured, for determining voltages and currents in different parts of the circuit, and the output informations from such measurements are used in logical combination for generating control signals, so as to perform the automatic control of the machining device in response to the instantaneous machining conditions thus determined by the informations.

Figure 12:
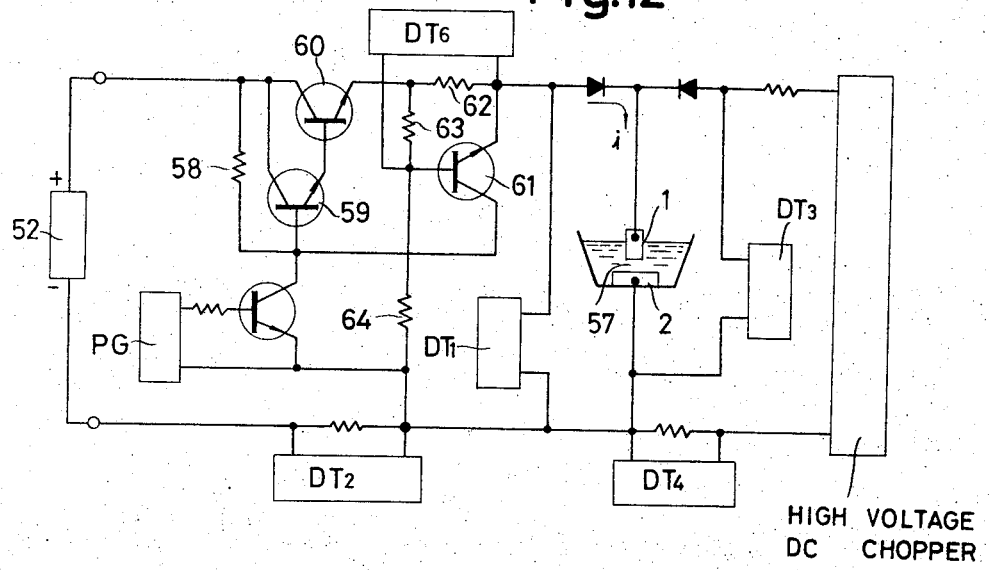

In the embodiment of the invention, as shown in FIGS. 11 and 12, up to six detecting units DT1 to DT6 are used for measuring voltage and currents in the electrical circuit of the machining device, and the output signals from such detecting units are suitably combined in a logic circuit. The detecting units DT1 to DT6 can be made of known Schmitt circuits or flip-flop circuits. The logic circuit may be consisted of NOT circuits, OR circuits, and AND circuits.

Referring to FIG. 11, there is no current flowing through the emitter resistor 51 and a high-voltage side resistor 56, when the discharge gap 57 between the electrode 1 and the workpiece 2 is not discharged (point 0 of FIG. 13), the detector units DT2, DT3, and DT4 are turned off. Instead, both a high-voltage and a low-voltage are applied across the discharge gap 57, and detecting units DT1 and DT3 are turned on. By suitably combining the outputs from such detecting units in the logic circuit (not shown), a control signal can be generated which represents that the machining device is operating at the point 0 of FIG. 13. By provision of a suitable actuating means (not shown), the electrode 1 can be moved toward the workpiece 2 in response to such control signal. If there is a substantial gap conductance across the discharge gap 57, the discharge machining device of FIG. 11 operates along Line $A_4$ of FIG. 13. It is apparent that the detecting units DT1 and DT4 are turned on, while the detecting units DT2, DT3, and DT5 are turned off, under such conditions. At this time, the outputs from the detecting units are so combined in the logic circuit (not shown) that the electrode 1 is moved away from the workpiece 2, and insulating liquid is forcedly fed into the discharge gap 57 for recovering the insulation there.

When the discharge through the gap 57 is stable, the machining device of FIG. 11 operates along Line $A_3$ of FIG. 13, and detecting units DT1, DT2, and DT4 are turned on, while the detecting units DT5 and DT3 are turned off. The logic circuit (not shown) and the actuating means (not shown) are so arranged as to very slowly move the electrode 1 towards the workpiece 2 in response to the signal resulting from such operation of the detecting units.

When the machining device of FIG. 11 operates along Line $B_2$ of FIG. 13, the detecting units Dt1 to DT2, DT4 DT5 are turned on, while the detecting unit DT4 is turned off. A control signal responding to such operation of the detecting units is such that the electrode 1 is kept stationary or moved very slowly away from the workpiece 2.

When the operation of the machining device of FIG. 11 is along Line $F_2$ or falls at the point $S_2$ (corresponding to the short-circuit across the discharge gap 57), the detecting unit DT4 is on, while the detecting units DT1, DT2, DT3 and DT5 are turned off.

If the voltage across the discharge gap 57 is lowered below the point P of FIG. 13, a gate control circuit $gc$ operates, so as to turn off the transistor 15 for shifting the operation of the machining device to the point Q of FIG. 13. At the same time, the logic circuit (not shown) generates such a control signal that the electrode 1 quickly moves away from the workpiece 2.

Table III summarizes the aforesaid operations of the detecting units and the control signals generated by the logic circuit in response to such operations of the detecting units.

FIG. 12 illustrates another embodiment of the present invention. In the figure, upon occurrence of a short-circuit across a discharge gap 57, the short-circuit current is suppressed to a level below the machining current, by providing a bypassing transistor 61 which bypasses a base current to the bases of switching transistors 59 and 60 through a resistor 58, in response to the short-circuit of the discharge gap 57. The construction of the circuit of FIG. 12 is such that the reduction of the base current results in the desired suppression of the short-circuit current.

The on-off control of the bypassing transistor 61 is effected by using the polarity reversion of the voltage across the base and the emitter of the transistor 61, depending on the output voltage from a voltage divider having resistors 63 and 64 connected in parallel with a power source and the voltage drop across a current-detecting resistor 62 in a machining current path.

Figure 14:
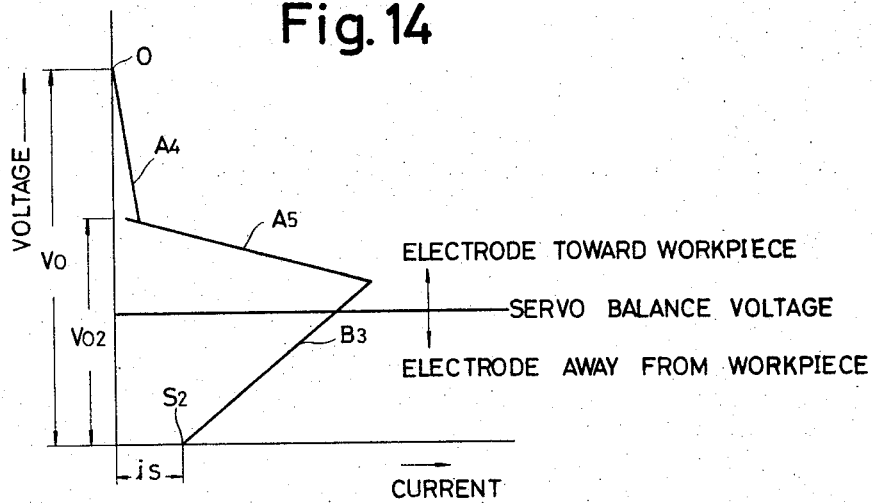

FIG. 14 shows the load characteristics of the device of FIG. 12.

In the electrical machining device of FIG. 12, a detecting unit DT6 is disposed between the base and emitter of the bypassing transistor 61, for differentiating a range (Line $A_5$ of FIG. 14) where the machining current increases from another range (Line $B_3$ of FIG. 14) where the machining current decreases, in response to the on-off operation of the transistor 61. The outputs from the detecting units DT1, DT2, and DT4 to DT6 are suitably combined in a logic circuit (not shown) to generate proper control signals.

Table IV summarizes the responses of the detecting units and the nature of the control various operative conditions of the discharge gap 57.

With the device of the present invention, various operations of an electrical discharge machining can automatically be controlled, for instance, the direction and speed of electrode movement and supply of machining liquid. By suitable application of such control to an electrical discharge machining device having non-linear load characteristics, the risk of hunting can completely be eliminated. If the device of the invention is combined with the aforesaid servo mechanism, which is actuated by the voltage across the discharge gap of the electrical discharge machining device, the automatic control of such machining device will be carried out more smoothly.

Furthermore, the control of the discharge gap can be made to respond to smaller changes in the circuit conditions, by improving the sensitivity of the detecting units DT1 to DT6. For instance, if the sensitivity of the detecting unit DT2 is quadrupled, the electrode 1 may be controlled in four different steps during the operation along load characteristics Line $A_3$ of FIG. 3; namely, for portions $A_3'$, $A_3''$, $A_3'''$, and $A_3''''$ of the Line $A_3$, as shown in FIG. 13. Similarly, if the sensitivity of the detecting unit DT1 is improved by $n$ times, the control of the electrode 1 may be carried out differently for four different portions of the Line $B_2$ of FIG. 13. Such improvement of the detecting units may easily be effected by making the detecting units with Schmitt cir-

TABLE III

| Gap condition (Fig. 13) | DT1 | DT2 | DT5 | DT3 | DT4 | Logical order signal |
|---|---|---|---|---|---|---|
| No discharge (at point 0) | On (high) | Off (low) | Off (low) | On (high) | Off (low) | Move electrode quickly to workpiece. |
| Gap conductance (midst of Line $A_4$) | On (high) | Off (low) | Off (low) | Off (low) | On (high) | |
| The other combination of gap conductance (midst Line $A_4$). | do | do | do | On (high) | do | Move electrode away from workpiece. Exchange oil in gap. |
| Stable discharge (midst of Line $A_3$) | On (high) | On (high) | Off (low) | Off (low) | On (high) | Move electrode very slowly to workpiece. |
| Stable discharge (midst of Line $B_2$) | do | do | On (high) | do | do | Stop electrode. |
| Short-circuit (at point $S_2$) | Off (low) | Off (low) | Off (low) | do | do | Move electrode quickly away from workpiece. |

TABLE IV

| Gap condition (Fig. 14) | DT1 | DT2 | DT3 | DT4 | DT6 | Logical order signal |
|---|---|---|---|---|---|---|
| No discharge (at point 0) | On (high) | Off (low) | On (high) | Off (low) | Off (low) | Move electrode quickly to workpiece. |
| Gap conductance (midst of Line $A_4$) | On (high) | Off (low) | Off (low) | On (high) | do | |
| The other combination of gap conductance. | do | do | On (high) | do | do | Move electrode away from workpiece. Exchange oil in gap. |
| Stable discharge (midst of Line $A_5$) | On (high) | On (high) | Off (low) | On (high) | Off (low) | Move electrode very slowly to workpiece. |
| Stable discharge (midst of Line $B_3$) | do | do | do | do | On (high) | Stop or raise electrode. Raising order from a voltage servo between electrode and workpiece. |
| Short-circuited (at point $S_3$) | Off (low) | do | do | do | do | Move electrode quickly from workpiece. | cuits and by regulating the bias voltage in such Schmitt circuits.

In the other embodiment of the present invention, the conditions of the discharge gap are detected by monitoring pulse voltages across the discharge gap and the current therethrough, while using special sequence of pulses applied to the discharge gap. In general, when there is a sustained arc across the discharge gap, application of a comparatively low voltage corresponding to arc drop, e.g., of 20 volts to 30 volts, will cause a large current of several tens to several hundreds of amperes to flow through the discharge gap. On the other hand, upon recovery of the insulation across the discharge gap, a voltage of twice as high as the arc drop will not break through the insulation across the discharge gap.

According to another aspect of the invention, in the electrical discharge machining device which uses a series of periodic pulses adding low-voltage pulses for causing large machining currents (high power) to high-voltage pulses (relatively low power) for insulation breakthrough, the low-voltage pulses being in synchronism and in phase with the high-voltage pulses, $m$ pulses of each $n$ consecutive periodic pulses ($m$ being smaller than $n$) are made of the low-voltage pulses alone, so that the sustained arc condition and the condition readily producing sustained arc (both will be referred to as "arcing condition," hereinafter) at the discharge gap can be detected by monitoring whether a discharge is caused at the gap or not by means of such series of periodic pulses.

Figure 15:
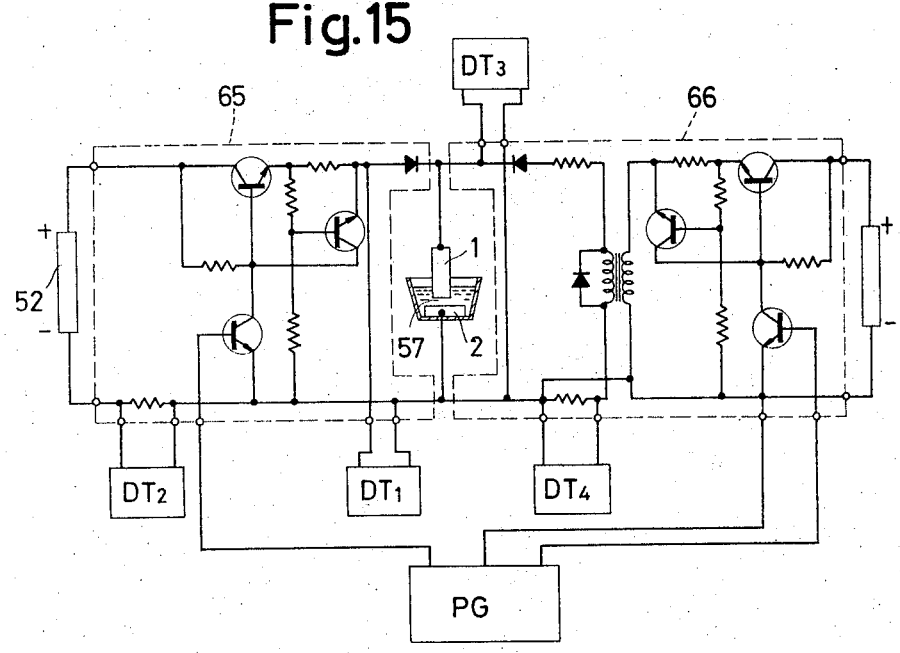
FIGS. 15 and 16 are electric circuit diagrams of different embodiments of the present invention, respectively.
Figure 16:
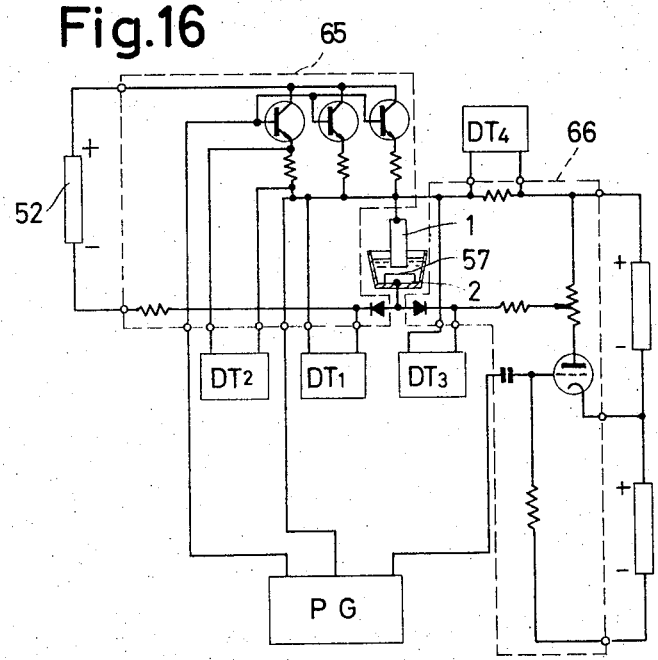
Figure 17:
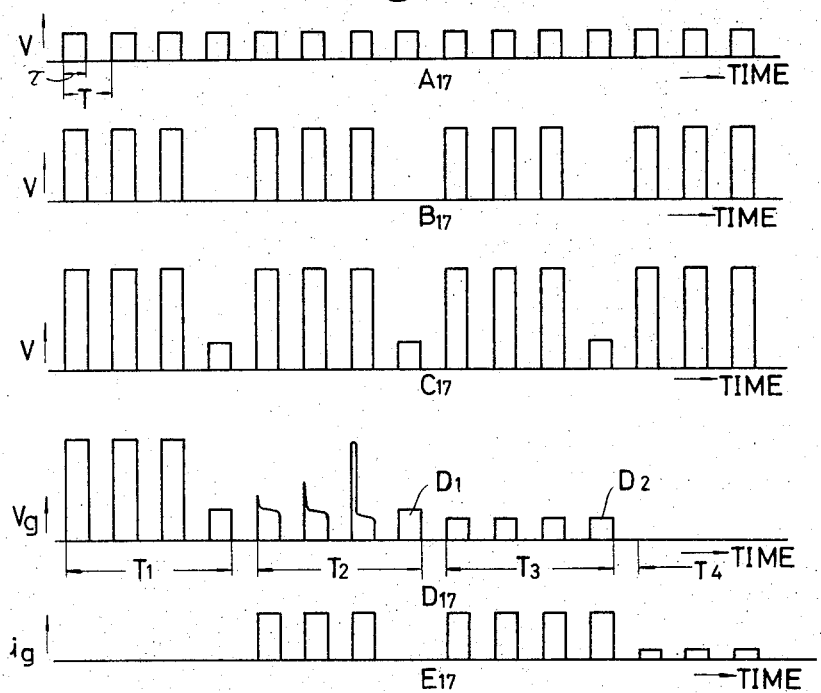
FIG. 17 is a graph, showing the waveform of voltage and current pulses in the devices of FIGS. 15 and 16.

In another embodiment of the invention, as illustrated in FIGS. 15 and 16, a low-voltage large machining current circuit 65 has an output voltage consisting of low-voltage pulses $A_{17}$ of FIG. 17, while the high-voltage circuit 66 for insulation breakthrough has an output voltage, as shown by pulses $B_{17}$ of FIG. 17. In the illustrated embodiment, the pulses $A_{17}$ are in synchronism and in phase with the pulses $B_{17}$, except that every fourth high-voltage pulse is eliminated, as shown in the waveform $B_{17}$. Waveform $C_{17}$ of FIG. 17 represents the sum of the pulses $A_{17}$ and $B_{17}$, in which every fourth pulse is lower than the remainder. The waveform $D_{17}$ shows the voltage drop across a discharge gap, such as the gap 57 of FIG. 15. The $T_1$ portion of the waveform $D_{17}$ represents the voltage drop when there is no discharge across the gap 57; the portion $T_2$ represents the voltage drop during normal stable discharge across the gap 57, which clearly indicates that the every fourth low-voltage pulse $D_1$ does not cause any discharge; the portion $T_3$ represents the voltage drop during the arcing condition, which clearly shows that even the every fourth low-voltage pulse causes the discharge with an arc drop $D_2$; and the portion $T_4$ represents the short-circuit condition. The waveform $E_{17}$ represents the current through the discharge gap 57. There is no current for the period corresponding to the portion $T_1$ of the drop waveform $D_{17}$, and the current is present only for the periods corresponding to the portions $T_2$ to $T_4$ of the waveform $D_{17}$.

Suitable voltage and current detecting units DT1 to DT4 are provided in the circuit of FIGS. 15 and 16 using low-voltage pulses (for machining current) and high-voltage pulses for insulation breakthrough. The outputs from the detecting units DT1 to DT4 are combined in a logic circuit 67a of FIG. 18, for detecting the aforesaid arcing condition at the discharge gap 57. The relation among the gap conditions and the outputs from the detecting units DT1 to DT4 and the high-voltage input signals is shown in Table V.

TABLE V

| Gap condition | DT1 | DT2 | DT3 | DT4 | High-voltage input signal |
|---|---|---|---|---|---|
| Not discharging | On (high) | Off (low) | On (high) | Off (low) | On (high). |
| Gap conductance | On (high) | Off (low) | Off (low) | On (high) | On (high). |
| The other combination of gap conductance | do | do | On (high) | do | On (high). |
| Stable discharge | On (high) | On (high) | Off (low) | On (high) | On (high). |
| Short-circuited (with high-voltage input) | Off (low) | do | do | do | Do. |
| Not arcing | On (high) | Off (low) | do | Off (low) | Off (low). |
| Arcing | do | On (high) | do | do | Do. |
| Short-circuited (without high-voltage input) | Off (low) | do | do | do | Do. |

The responses of the detecting units are as follows. The detecting unit DT1 is turned on when the low-voltage pulse, for causing the machining large current, exceeds a certain given value. The detecting unit DT2 is turned on when the current pulse through the discharge gap 57 exceeds a certain given value. The detecting unit DT3 is turned on when the high-voltage pulse exceeds a certain given value. The detecting unit DT4 is turned on when the high-voltage pulse caused a current through the discharge gap 57.

With such detecting units DT1 to DT4, three different conditions of the discharge gap 57 can be distinguished to one another, based on the relation of Table V; namely, the presence of considerably large gap conductance due to the accumulation carbon particles, the arcing condition, and the stable discharging condition.

The formation of $m$ low-voltage pulses in each $n$ consecutive periodic pulses ($m$ being smaller than $n$) can be effected by generating intermittently lacking high-voltage pulses. The values of $m$ and $n$ can be arbitrary, as long as they are finite integers with the relation of $m$ being smaller than $n$. It means that $n$ is an integer of 2 or larger, and $m$ is an integer of not smaller than 1.

Figure 18:
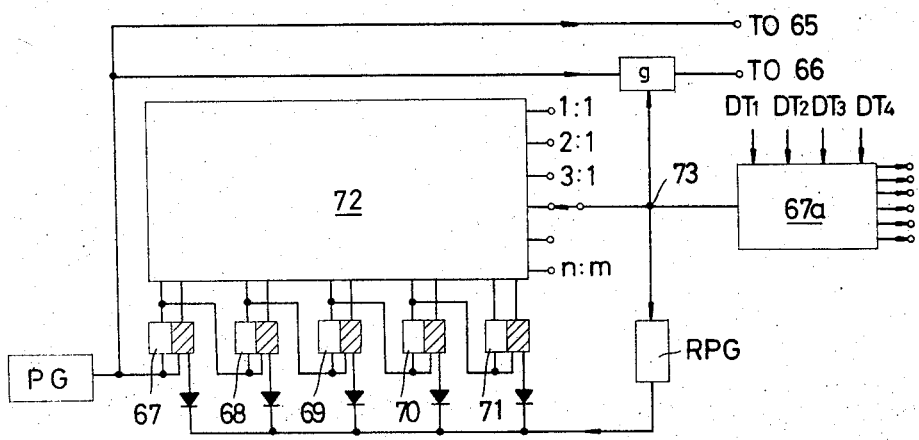
FIG. 18 is a circuit diagram of a control pulse generator.

FIG. 18 also illustrates an electric circuit for generating the intermittently lacking pulses. A pulse generator generates a series of pulses at uniform intervals with a duty fact of $\tau/T$, $T$ being the period of the uniform pulse cycle and $\tau$ being the duration of each individual pulse. A part of the output from the pulse generator PG is directly applied to the large-current chopper circuit 65 (FIGS. 15 and 16), as the input thereto. Another part of the output from the pulse generator PG is applied to a flipeflop circuit 67. The output from the flip-flop circuit 67 constitutes the symmetrical trigger signal of a succeeding flip-flop circuit 68, and forms a part of the input signals to a decoder matrix 72. In the illustrated example, five flip-flop circuits, each acting as a binary counter, are used.

For each $n$ output pulses from the binary counters, no output signal is applied to the output terminal 73 of the decoder matrix 72 for $m$ pulses. For such $m$ pulses, a gate $g$ is closed, for blocking the delivery of high-voltage pulses to the high-voltage chopper circuit 66. When the output voltage is resumed at the output terminal 73, a reset pulse generator RPG is actuated for resetting all the flip-flop circuits 67 to 71 to zero, for re-starting the counting of the consecutive $n$ pulses.

A logic circuit 67a combines the output signals from the detecting units DT1 to DT4 and the output signals from the decoder matrix 72, based on the relation of Table V, for determining the conditions of the discharge gap 57.

It is apparent for those skilled in the art to makeup the flip-flop circuits 67 to 71, the decoder matrix 72, the logic circuit 67a, the gate $g$, and the reset pulse generator RPG for that purpose. Accordingly, no detailed description of such parts will be made here.

As described in the foregoing disclosure, according to the invention, the conditions of the discharge gap can be accurately monitored without interrupting the machining operation, by removing $m$ pulses of each $n$ consecutive pulse inputs to a high-voltage chopper circuit 66, so as to check whether a discharge is caused only by low-voltage pulses at the discharge gap. Such monitoring of the discharge gap condition can be applied to the automatic control of the machining electrode of the electrical discharge machining device, as pointed out in the foregoing. Thus, the need of experienced operator can greatly be reduced.

It is also possible to distinguish the stable discharge condition of the gap 57 from the arcing condition by slightly shifting the phase of the high-voltage pulses relative to the low-voltage pulses, so that proper measures can be taken for the automatic control of the machining operation; namely, blocking of the succeeding high-voltage pulses, reducing the pulse duration, and the movement of the electrode.

Figure 19:
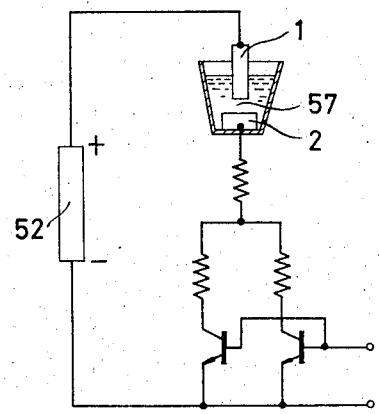
FIG. 19 is a schematic diagram of an independent impulse type electrical discharge machining device using transistors.
Figure 20:
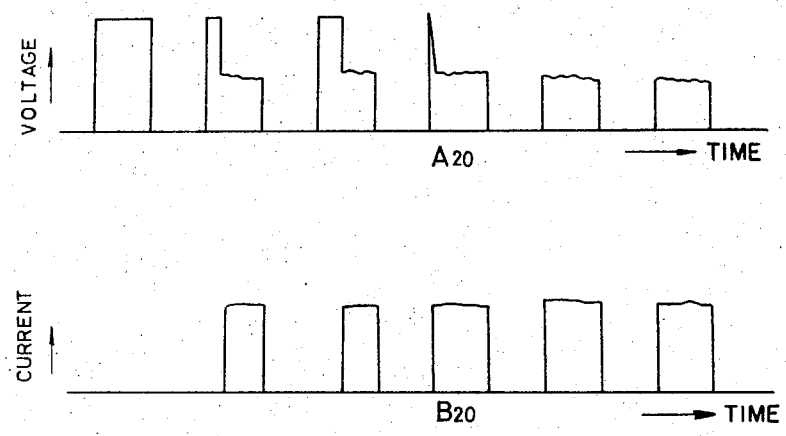
FIG. 20 is a graph, showing the waveform of voltage and current pulses in the device of FIG. 19.

In a known electrical discharge machining device, as shown in FIG. 19, two methods have heretofore been employed for detecting the arcing conditions at the discharge gap 57. (1) The arcing condition is detected by checking that the mean voltage across the discharge gap is below a certain given value for an extended period of time and that the voltage across the discharge gap is finite. (2) The arcing condition is detected by distinguishing the normal discharging operation in view of the fact that the normal discharge does not take place in the initial part of the high-voltage pulse, as shown by waveforms $A_{20}$ and $B_{20}$ of FIG. 20. The methods (1) and (2), however, are not so reliable because the arcing condition cannot be detected directly.

More particularly, in the method (1), due to the fact that the normal discharge is also a kind of arcing (sometimes the normal discharge is referred to as transient arcing, for distinguishing it from sustained arcing), it is not always easy to distinguish the sustained arc, which is detrimental to the machining operation, from the useful transient arc. Accordingly, the method (1) is generally effective only for the dependent type electrical discharge machining device having a comparatively large ratio of the insulation-breaking voltage to arc drop. With this method, the detrimental sustained arc is detected only after such sustained arc has lasted for some time. Accordingly, the machined surface is inevitably rough and the electrode is excessively consumed during such arcing period. Furthermore, the machining speed is lowered.

With the method (2), the sustained arc is detected only by accumlating the rising parts of the pulses for some period of time or a given number of pulses, which are measured by a certain sequence. When comparatively high voltage pulses (60 volts to 100 volts) are used both for insulation breakthrough and for causing the machining current, the insulation breakthrough takes place in the very beginning of the voltage pulse to make it difficult to ensure accurate operation of the known detecting device, based on the method (2). In short, when the discharge begins at the leading end of the voltage pulse, the detrimental sustained arc is hardly distinguishable from the useful transient arc, either from theoretical standpoint or from practical standpoint.

Accordingly, there has been a need to provide means for distinguishing the useful normal discharge from the detrimental sustained arc for each of the voltage pulses. The present invention can respond to such need, by providing an improved device which distinguish the useful normal discharge from the harmful sustained arc for each voltage pulse, by applying a voltage (about 25 volts to 40 volts) slightly higher than the arc drop to the discharge gap immediately after the beginning of the non-discharge period (the beginning of the off period), for checking whether the gap is discharged or not by such additional voltage.

Figure 21:
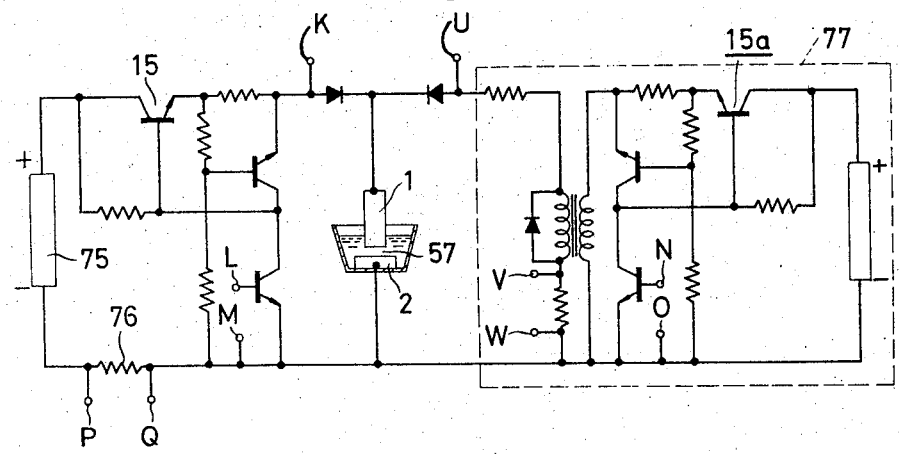
FIGS. 21 and 22 are circuit diagrams, showing independent type electrical discharge machining devices which use machining low-voltage pulses and insulation breakthrough high-voltage pulses in synchronism with each other.
Figure 22:
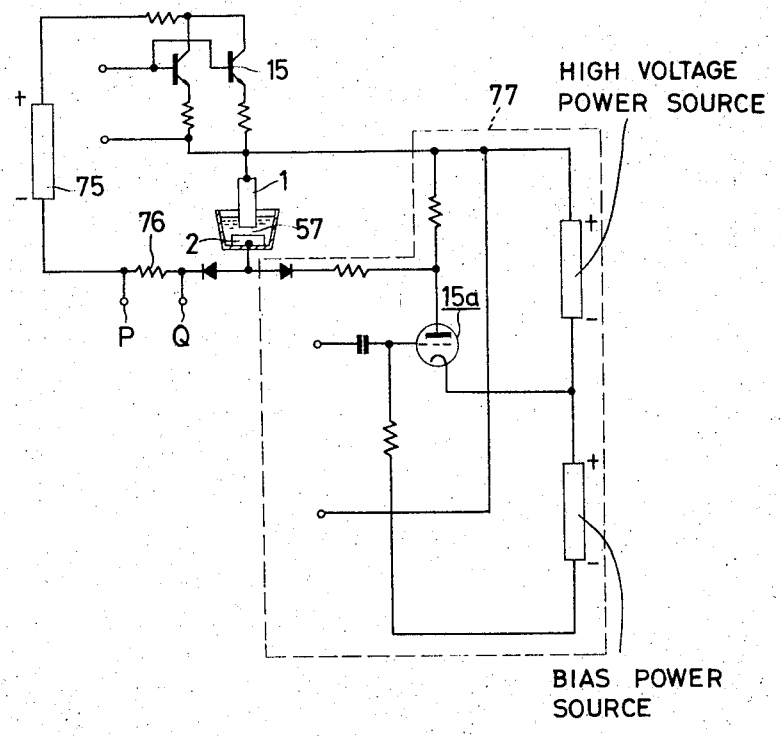
Figure 23:
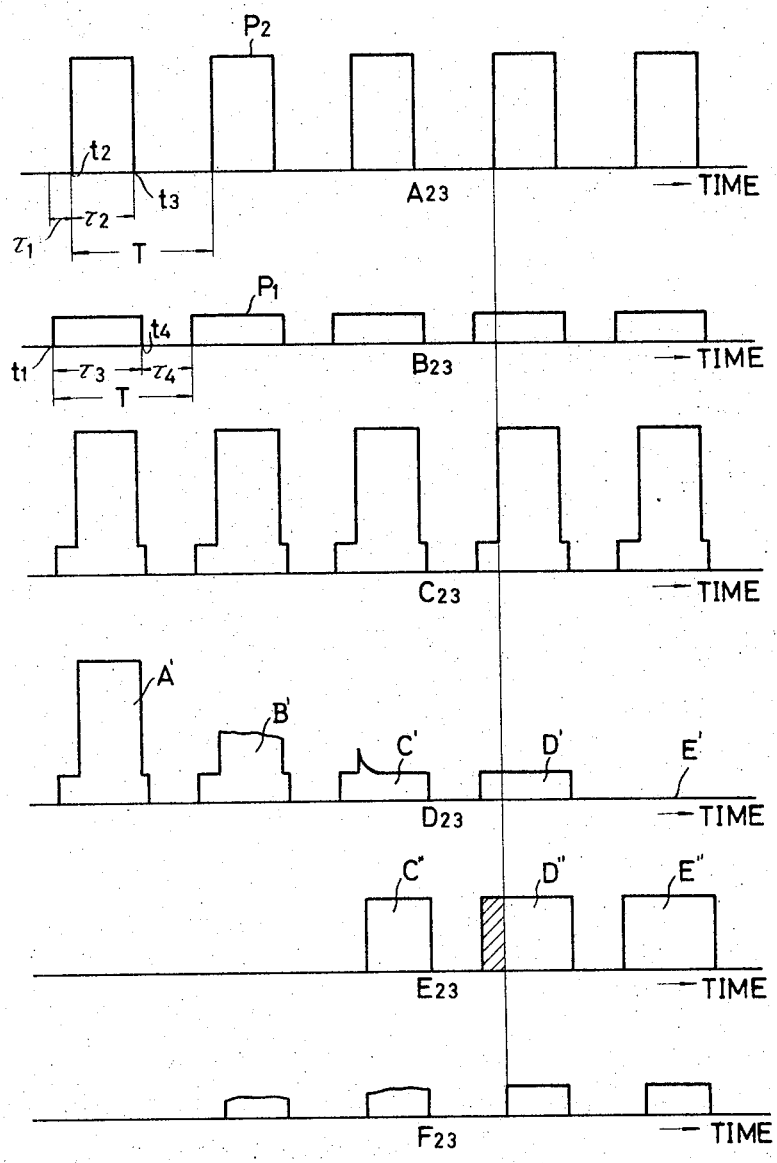
FIG. 23 is a graph, showing the waveform of voltage and current pulses in the circuit of FIGS. 21 and 22.

FIGS. 21 and 22 illustrate different embodiments of the present invention, and FIG. 23 shows waveforms of currents and voltages, inclusive low-voltage pulses $P_1$ for causing machining large currents and high-voltage pulses $P_2$ for insulation breakthrough. The trailing ends of the pulses $P_1$ and $P_2$ are substantially in phase. After a no-voltage period of $\tau_4 (= T - \tau_3$, $T$ being the period of the pulse cycle and $\tau_3$ being the duration of the low-voltage pulse $P_1$) from the trailing end of each low-voltage pulses, a switching means 15 (a transistor in FIGS. 21 and 22) on the low-voltage side is turned on at the time $t_1$, and then another switching means 15a (a transistor or a vacuum tube) on the high-voltage side is turned on at the time $t_2$ which is later than the time $t_1$ by $\tau_1$, as shown in the waveforms $A_{23}$ and $B_{23}$. In FIG. 23, the waveform $C_{23}$ represents the sum pulses of the pulses $P_1$ and $P_2$ as overlapped in the aforesaid phase relation; the waveform $D_{23}$ represents the voltage across the discharge gap 57; the waveform $E_{23}$ represents the machining current through the discharge gap 57 (low-voltage side current); and waveform $F_{23}$ represents the current through the high-voltage side circuit. In the waveform $D_{23}$, the voltage $A'$ appears across the discharge gap 57 when it is insulated; the voltage $B'$ when there is a substantial gap conductance due to carbon particles accumulated therein; the voltage $C'$ when normal discharge takes place; the voltage D' when there is a sustained arc; and the voltage E' when the discharge gap 57 is short-circuited.

If the insulation across the discharge gap 57 is fully restored after the preceding discharge, the gap is not discharged during the period $t_1$ to $t_2$, and the normal discharge begins after the application of the high-voltage pulse at the time $t_2$ at a moment between the time $t_2$ to $t_3$ (waveform $A_{23}$ of FIG.23). If the discharge gap 57 should be in the aforesaid arcing condition with a sustained arc or ready for causing such sustained arc, the discharge through the gap 57 starts immediately after the time $t_1$. In the embodiments, as illustrated in FIGS.21 and 22, the power source 75 for the low-voltage pulses for causing the machining large current ranges 25 volts to 40 volts, while the high-voltage pulse generator 77 for insuration breakthrough generates an output voltage of higher than 100 volts.

If there should be caused any discharge in the time period $t_1$ to $t_2$, as shown in FIG.23, such discharge can be detected by the voltage drop across a shunt resistor 76 in the machining current path during such period. The circuit of FIG.21 has an advantage in that the output voltage of the machining power source 75 can be low, and the low power source voltage for the machining current makes the detection of the arcing condition easier.

The arcing condition is detected by using the shaded portion of the waveform $E_{23}$, D'' of FIG.23. By means of such detection of the arcing condition, the presence of the gap conductance can simultaneously be detected.

Figure 24:
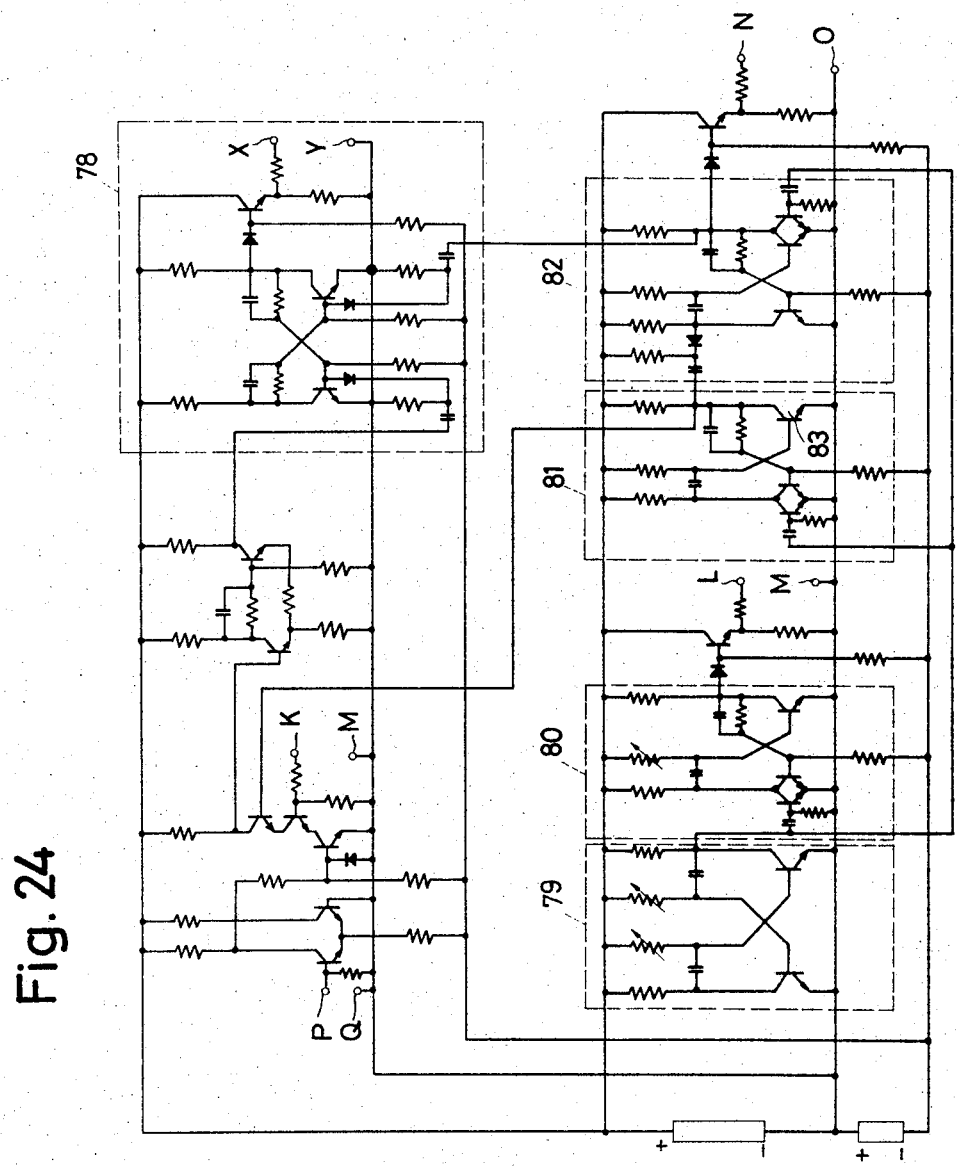
FIG. 24 is a schematic diagram of a logic circuit for detecting arcing condition across the discharge gap in the devices of FIGS. 21 and 22.

FIG.24 illustrates a circuit which includes a logic circuit for detecting the arcing condition and a pulse generating circuit for the electrical discharge machining device, as shown in FIGS.21 and 22. The circuit of FIG.14 also includes a portion 78 for reducing the machining current, as will be described hereinafter. A multivibrator 79 determines the period T of the voltage pulses, and a monomultivibrator 80 determines the duration $\tau_3$ of the low-voltage pulses and has output terminals L and M which are to be connected to the similarly symbolized terminals of the circuit of FIG.21. A monomultivibrator 81 determines the delay time $\tau_1$ (duration of low-voltage pulse alone) from the leading edge of the low-voltage pulse to the cooperating leading end of the high-voltage pulse. A multivibrator 82 determines the duration $\tau_2$ of the high-voltage pulse, and the output terminals N and 0 of the monomultivibrator are connected to the similarly symbolized terminals of the circuit of FIG.21. The time $(\tau_1 + \tau_2)$ is usually selected to be shorter then the duration $\tau_3$.

The occurrence of the aforesaid arcing condition can be detected by sensing the simultaneous presence of a signal indicating the off condition of a transistor 83 of the monomultivibrator 81 (in the period $t_1$ to $t_2$), a signal (a voltage across ther terminals P and Q) representing the presence of the machining current, and another signal indicating the presence of a voltage at the output terminals. The simultaneous presence of such three signals can be sensed by an AND circuit portion of the logic circuit.

Figure 25:
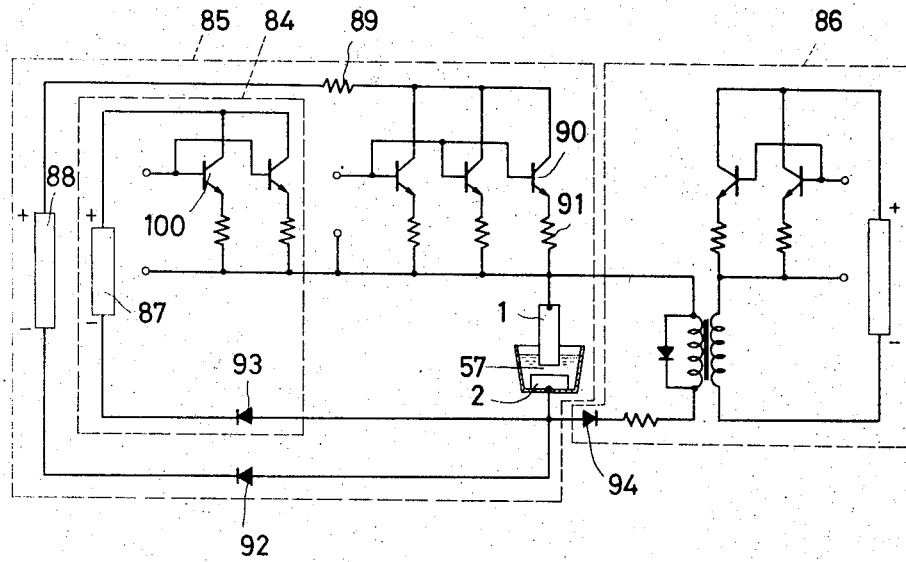
FIG. 25 is a schematic diagram of an electrical discharge machining device incorporating a single switching circuit for detecting the arcing conditions.

FIG.25 illustrates an electrical discharge machining, which includes three switching circuits 84, 85, and 86 for independently generating low-voltage medium-current pulses for arc detection, medium-voltage large-current pulses for machining, and high-voltage low-current pulses for insulation breakthrough, respectively. The switching circuit 84 generates low-voltage pulses which are applied to the discharge gap 57 during the time interval $t_1$ to $t_2$ of FIG.23, for checking whether an arc is generated through the gap 57 by such low-voltage or not. In this sence, the embodiment of FIG.25 is similar to the preceding embodiment. However, the embodiment of FIG.25 is featured in that the voltage of the power source 87 is very low, e.g. of 20 volts to 35 volts. The output current from the switching circuit 84 can be less than 10 A.

The switching circuit 85 is driven by an input signal, which is in phase with an input signal to the high-voltage switching circuit 86. Thus, the duration of the input pulse is $\tau_2$ representing a time interval $t_2$ to $t_3$ of FIG.23. The medium-voltage large-current pulse switching circuit 85 consists of a power source 88, a current-limiting resistor 89, transistors 90, emitter current dividing resistors 91, and a diode 92. The power source 88 has an output voltage of 40 volts to 100 volts, and delivers a large machining current of 10 A to 1,000 A. The switching circuit 86 generates high-voltage pulses of 100 volts or higher. The mutual interferences among the switching circuits 84, 85, and 86 is prevented by inserting diodes 92, 93, and 94 in such switching circuits, respectively.

Table VI shows the relation among various quantities being monitored for different conditions of the discharge gap 57. Table VI is characterized in that it includes two logic systems; namely a logic system for the time interval $t_1$ to $t_2$, and another logic system for the time interval $t_2$ to $t_3$.

Table VI

| Gap condition | Low side voltage (between K and M, Fig. 21) | Low side voltage (between P and Q, Fig. 21) | High side voltage (between U and W, Fig. 21) | High side voltage (between V and W, Fig. 21) | Detecting intersal (Fig. 23) |
|---|---|---|---|---|---|
| Insulated (no discharge with low-voltage pulse alone) | On (high) | Off (low) | Off (low) | Off (low) | $t_1$ to $t_2$ |
| Arcing (discharge with low-voltage pulse alone) | do | On (high) | do | do | $t_1$ to $t_2$ |
| Short-circuited in the detecting interval $t_1$ to $t_2$ | Off (low) | do | do | do | $t_1$ to $t_2$ |
| Sound insulation | On (high) | Off (low) | On (high) | do | $t_2$ to $t_3$ |
| Gap conductance | On (high) | Off (low) | Off (low) | On (high) | $t_2$ to $t_3$ |
| The other combination of gap conductance | do | do | On (high) | do | $t_2$ to $t_3$ |
| Discharged (inclusive stable discharge and arcing) | On (high) | On (high) | Off (low) | On (high) | $t_2$ to $t_3$ |
| Short-circuited in the detecting interval $t_2$ to $t_3$ | Off (low) | do | do | do | $t_2$ to $t_3$ |

As described in the foregoing, the presence of the aforesaid arcing condition can be detected for each of the pulses, by applying the low-voltage pulses for arc detection and high-voltage pulses for insulation breakthrough to the discharge gap 57, with a suitable phase difference therebetween. It should be noted that the low-voltage large-current pulses for the machining operation can be also used as the low-voltage medium-current pulses for arc detection (FIGS. 21 and 22). Upon detection of the arcing condition for each pulse, the following measures can be taken.

If a discharge is caused in the time interval $t_1$ to $t_2$ (arcing condition), the pulse durations $\tau_3$ and $\tau_2$ by an amount corresponding to $\tau_1$ (for shortening the trailing portion of the pulses). With such reduced durations, the discharge pulse energy can be the same for the insulated condition and the arcing condition. Furthermore, the time interval ($T-\tau_3$) increases, for extending the non-arcing time, so that the time available for insulation recover at the discharge gap 57 increases, upon detection of the arcing condition. Thus, the risk or danger of restriking by the arc across the gap 57 is reduced.

When the arcing condition is detected in the time interval $t_1$ to $t_2$, a signal representing such presence of the arcing condition can be stored in a flip-flop circuit for a time being, so at to block the high-voltage pulse and the arc detecting pulse to come in immediately after the very pulse having detected the arcing condition. With such blocking, the pulses become a kind of intermittently lacking pulses, and the insulation recovery at the discharge gap 57 is promoted.

Figure 26:
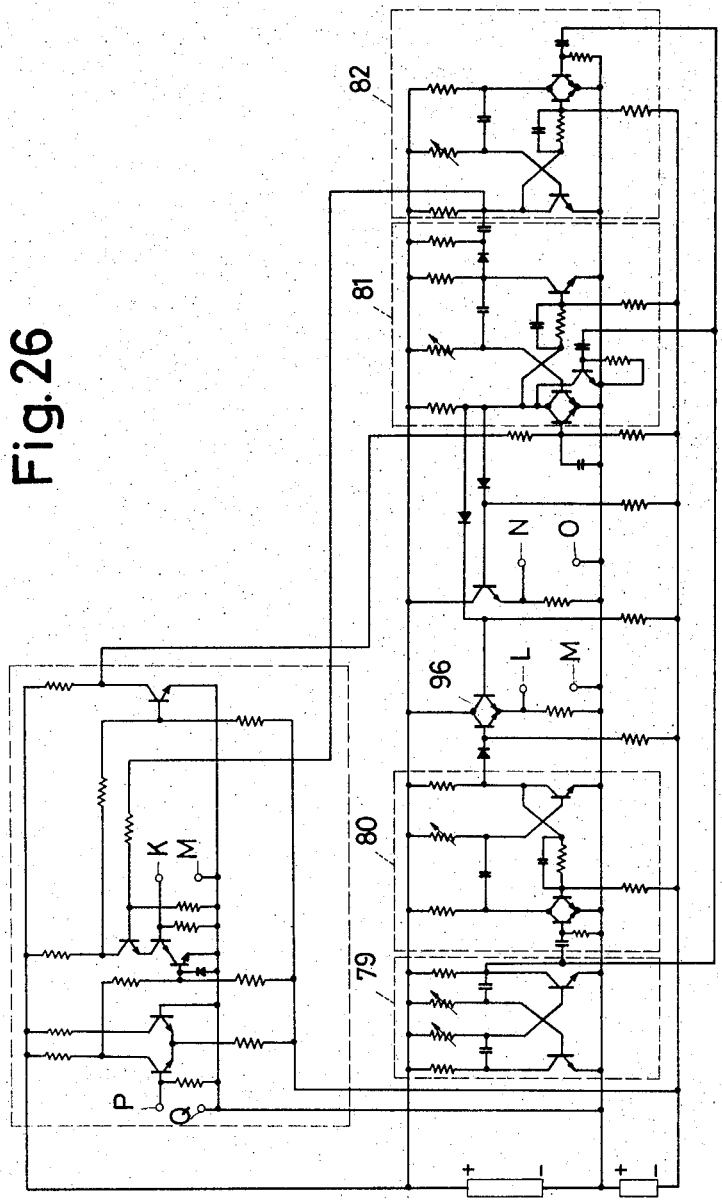
FIGS. 26 and 27 are schematic diagram of pulse-generating circuits which erase pulses after the moment when a certain arcing condition is detected.

FIG. 26 illustrates a circuit for forwarding the timing $t_3$ and $t_4$ (FIG. 23), in order to shorten the pulse duration, upon detection of the arcing condition in the time interval $t_1$ to $t_2$. The pulse control circuit of FIG. 26 includes a multivibrator 79 for determining the period $T$, a monomultivibrator 80 for determining the duration $\tau_3$, a monomultivibrator 81 for determining the duration $\tau_1$, and another monomultivibrator 82 for generating pulses with a duration of about ($\tau_2-\tau_1$). Upon detection of the arcing condition by a logic circuit 95, the monomultivibrator 82 is actuated in response to a signal from the logic circuit 95 representing the arcing condition. The output from the monomultivibrator 82 is applied to a transistor OR circuit 96, which also receives signals from the monomultivibrator 80. Thereby, the duration of the output pulse is shortened.

Figure 27:
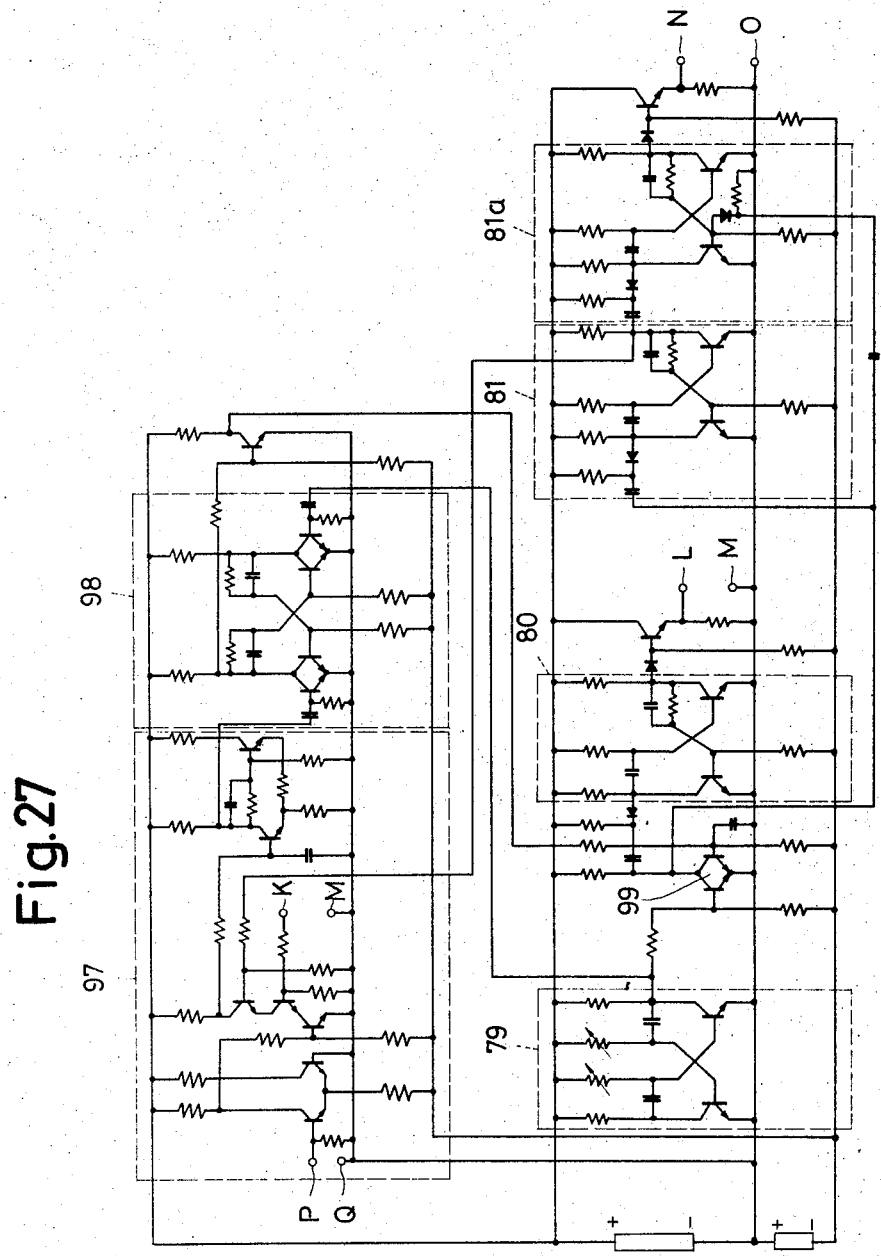

FIG. 27 illustrates a circuit for blocking certain pulses when the arcing condition is detected in the time interval $t_1$ to $t_2$ (FIG. 23). Upon the operation of the logic circuit 97 in response to such detection, a flip-flop 98 is set, to turn off an OR gate 99. Thus, a clock pulse coming in immediately after the pulse having detected the arcing condition is blocked. Accordingly, the monomultivibrator 80 for determining the pulse duration $\tau_3$ and other monomultivibrators 81 and 81a supplying input signals to a high-voltage chopper become inoperative for one pulse or cycle just after the detection of the arcing condition. As a result, there will be no output signals at terminals L, M, N, and O. Consequently, if one pulse detects the arcing condition, the nextly following pulse is blocked. The clock pulse next to that which corresponds to the pulse detecting the arcing condition resets the flip-flop 98, to turn on the gate 99.

Figure 28:
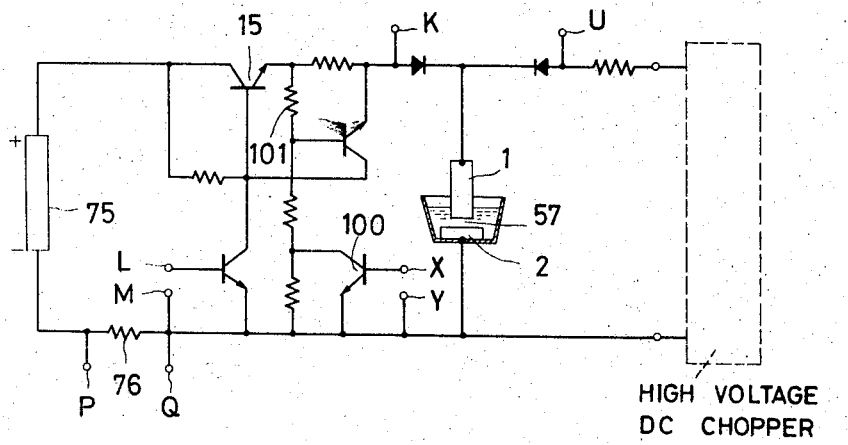
FIG. 28 is a schematic diagram of an electrical discharge machining device, which reduces its machining current upon detection of arcing.

Alternately, upon detection of the arcing condition, a circuit of FIG. 28 acts to turn off the input terminals X and Y of a bypassing transistor 100, which is in parallel with a discharge gap 57, for a time interval $t_2$ to $t_3$, or $t_2$ to $t_4$. Accordingly, the voltage across a resistor 101 is reduced, to cut down the maximum machining current through a switching transistor 15. Thereby, the cooling of the anode and cathode points is sufficiently made during the non-discharging time interval, for ensuring the insulation recovery at the discharge gap. It is, of course, possible to combine this current reduction with the aforesaid reduction of pulse duration and blocking of the pulses.

As described in the foregoing disclosure, the arcing condition is distinguished from the stable discharge for each pulse, and suitable measures can quickly be taken in response to the detection of the arcing condition, for ensuring optical operation of the electrical discharge machining device.

Instead of blocking one pulse immediately after the detection of the arcing condition, it is also possible to block a plurality of the succeedingly coming pulses until the arcing condition is eliminated.

Similarly, instead of reducing maximum current value of one current pulse immediately after the detection of the arcing condition, the suppression of the maximum current value can be applied to a plurality of current pulses after the detection of the arcing condition until such arcing condition is removed.

In regulating the electrode and the discharge gap, upon the detection of the arcing condition, it is useful to know the electrode area for selecting a proper duty factor or a proper maximum machining current at each moment of the machining operation. According to another feature of the present invention, there is provided a means for detecting such electrode area at each moment.

Figure 29:
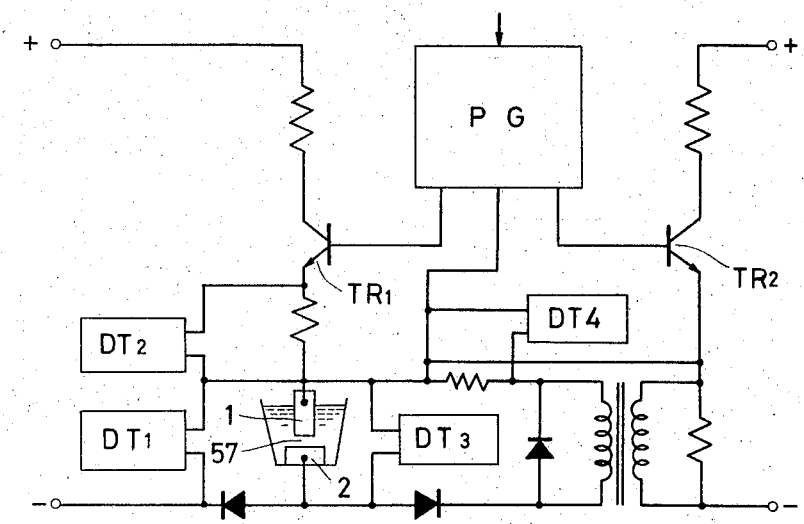
FIG. 29 is a schematic diagram of an electric discharge machining device, in which voltages at different parts are detected by superimposing a synchronized high voltage.

Table VII shows the relation among the detected signals in a circuit of FIG. 29 and the conditions of the discharge gap 57 of the electrical discharge machining device using such circuit.

TABLE VII

| Gap condition | DT1 | DT2 | DT3 | DT4 | TR2 | Encoder pulse density | Logical control signal |
|---|---|---|---|---|---|---|---|
| No discharge | On (high) | Off (low) | On (high) | Off (low) | On (high) | Dense | Use small $\tau/T$, and feed slowly. |
| Gap conductance | do | do | do | On (high) | do | Indefinite | Raise electrode, and exchange machining liquid. |
| Immediately after stable discharge | do | On (high) | Off (low) | do | do | Dense | Use smal $\tau/T$, and feed slowly. |
| Arcing condition | do | do | do | Off (low) | Off (low) | Indefinite | Raise electrode, and reduce $\tau/T$ or current. |
| Short-circuited (with TR2 on) | Off (low) | do | do | On (high) | On (high) | Dense | Raise electrode, and reduce $\tau/T$. |
| Stable discharge (with quick feeding) | On (high) | do | do | do | do | do | Machine with small $\tau/T$. Electrode area is small. |
| Stable discharge (with servomotor fed slowly or stopped) | do | do | do | do | do | Sparse | Machine while gradually increasing $\tau/T$. Electrode area is large. |

TABLE VII —Continued

| Gap condition | DT1 | DT2 | DT3 | DT4 | TR2 | Encoder pulse density | Logical control signal |
|---|---|---|---|---|---|---|---|
| Short-circuited (with TR2 off) | Off (low) | do | do | Off (low) | Off (low) | Dense | Raise electrode with small $\tau/T$. |
| Electrode descending after recovery from short-circuit. | On (high) | Off (low) | On (high) | do | On (high) | do | Use small $\tau/T$, and feed slowly. |
| Electrode ascending with high gap conductance. | do | do | Off (low) | On (high) | do | do | Use small $\tau/T$, and raise electrode. |
| Electrode descending after refreshing the discharge gap. | do | do | On (high) | Off (low) | do | do | Feed while reducing $\tau/T$ or current. |

Figure 30:
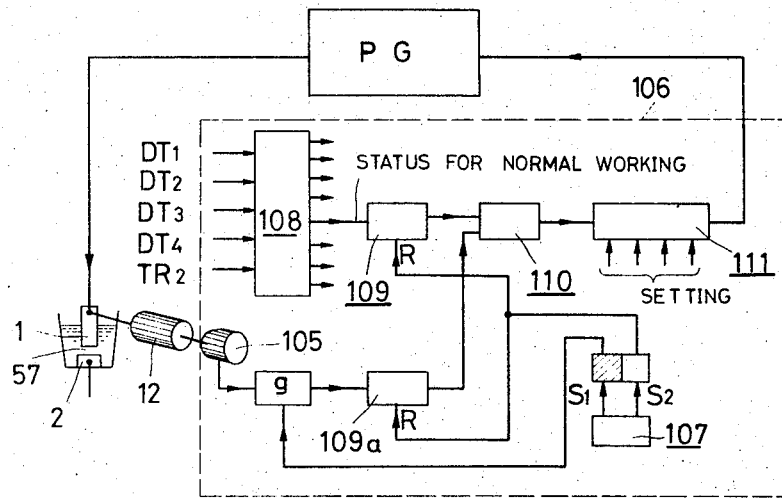
FIG. 30 is a diagrammatic illustration of a method for determining an electrode area.

If the number of high-or low-voltage pulses or the number of discharges per unit time is counted, the count of such pulses per unit time is proportional to the machining volume, provided that the discharge is stable during the machining, because the machining stroke is constant for constant pulse duration and constant maximum machining current. On the other hand, an encoder 105 directly connected to a servomotor 12, as shown in FIG.30, generates pulses, whose count is proportional to the stroke of the servomotor, this is the depth of machining operation. Thus, the quotient obtained by dividing the discharge count by the feeding count from the encoder 105 will be a quantity corresponding to the electrode area during the machining operation.

FIG.30 illustrates an example of such circuit for determining the electrode area. In the figure, an area-detecting circuit 106 consists of the encoder 105, a timer 107, a logic circuit 108, counters 109 and 109a, a divider 110, and a comparator 111. When the input to the comparator 111 is larger than a preset value, an order signal is given so that the maximum value of the duty factor is increased. On the other hand, if the input to the comparator 111 is smaller than the preset value, another order signal is given so that the duty factor is reduced. Accordingly, with an electrical discharge machining device, as shown in FIG.30, the maximum value of the duty factor can automatically be controlled in response to the magnitude of the electrode area. As a result, the operator need not set the duty factor, and a knob for such setting can be dispensed with.

It should be noted here that the logic circuit in the device of FIG.30, according to the present invention, counts only effective discharges (during the normal stable discharging), but not when there is a substantial gap conductance, discharge failure, or short-circuit. Thus, the quantity representing the electrode area, which is obtained in the aforesaid manner, is very accurate. Consequently, highly reliable control can be effected.

Figure 31:
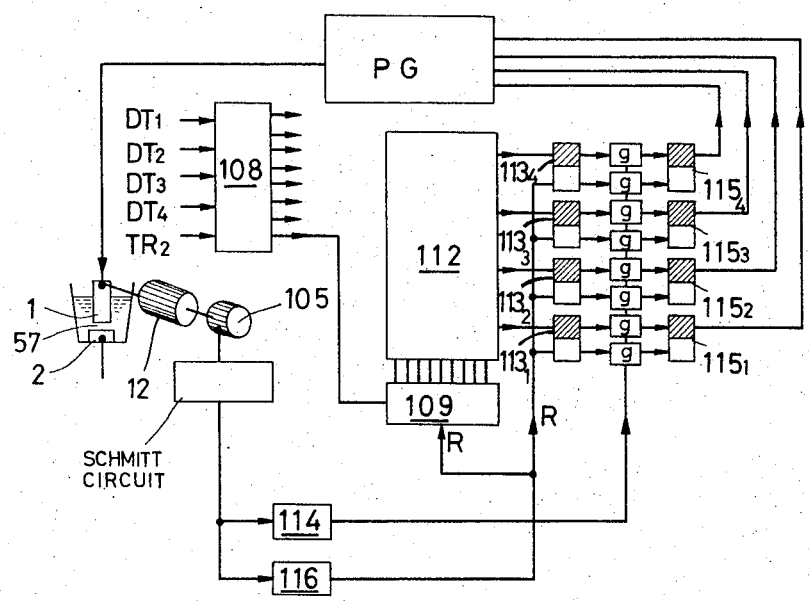
FIG. 31 is a diagrammatic illustration of a circuit for detecting the electrode area without using any divider.
Figure 32:
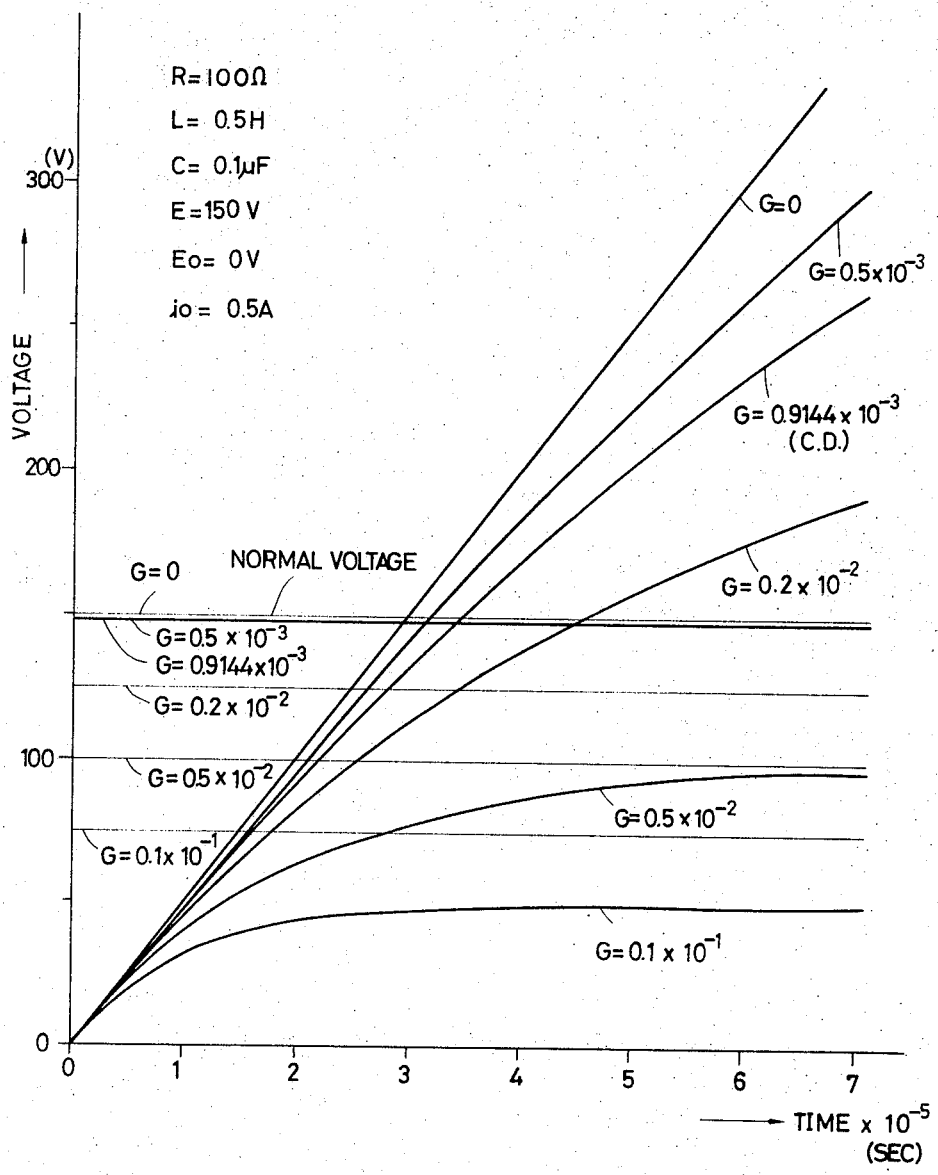
FIG. 32 is a graph, showing the voltage characteristics for charging an R-L-C-G circuit.

FIG.31 illustrates a practical control circuit, according to the present invention, for determining the electrode area without using the timer 107 and the devider 110 of FIG.30. With the circuit of FIG.31, the number of effective pulses for the minimum unit of the encoder 105 (for instance 1/1,000 mm). As the number of discharge counts for one output pulse from the encoder 105 increases, the machining area is assumed to increase, and the maximum value of the duty factor ($\tau/T$) is ordered to be reduced.

In the circuit of FIG.31, the encoder 105 generates one output pulse for each minimum unit of stroke, for resetting the counter 109. A decoder 112 connected to the counter 109 generates output signal, which is applied to one of flip-flop circuits $113_1$ to $113_4$ (to be referred to as "FF" hereinafter) for selecting the duty factor. If the output from the decoder 112 is applied to the FF $113_3$ at a certain moment, the preceding FF's $113_1$ and $113_2$ has been turned on previously and the FF $113_3$ is turned on at this moment, but the FF $113_4$ remains as turned off. Upon the application of a pulse from the encoder 105, a monomultivibrator 114 is turned on, for storing the conditions of the FF's $113_1$ to $113_4$ in other FF's $115_1$ to $115_4$, respectively, so that the maximum value of the duty factor can be determined. The FF's $115_1$ to $115_4$ retains the values thus stored until the next counting is completed, for selecting a proper maximum value of the duty factor. Then, another monomultivibrator 116 resets the FF's $113_1$ to $113_4$ and the counter 109, for starting the next counting. Thus, the logical control continues, even after the determination of the maximum value of the duty factor. The instantaneous value of the duty factor does not necessarily coincides with the maximum value thus set. In fact, the instantaneous value of the duty factor is smaller than the maximum value, when the output pulses from a pulse generator are partially blocked in the aforesaid manner due to the peaking at the discharge gap, or when the non-discharge period is increased.

Thus, the detection of the electrode area or a quantity corresponding to the electrode area enables the reasonable determination of the maximum values of the duty factor and the machining current. Besides, the need of setting the duty factor is completely eliminated. With the knowledge on the electrode area, the injecting pressure for the machining liquid can also be automatically controlled in response to the area thus detected. During the arcing condition or short-circuit condition at the discharge gap 57, the electrode 1 is raised and the count at the counter 109 is reduced to substantially zero. Accordingly, the maximum value of the duty factor is reduced. Since the next machining operation starts with such reduced maximum value of the duty factor, the risk of the hunting of the electrode 1 due to the too large setting of the duty factor is completely eliminated.

With the device of the invention, the discharge starts always with a small duty factor, and the machining gap does not increase excessively, regardless of the vertical movement of the electrode 1, for ensuring accurate machining.

The block diagrams of FIGS.30 and 31 show only the normal operating conditions and other operating conditions are not shown, for the simplicity's sake.

In electrical discharge machining devices, RLC circuits, as shown in FIG.2, are often used, which includes the currentalimiting resistor 4, the inductor 5 in series to the resistor 4, and a capacitor 3 in parallel with the discharge gap 57. The inductor 5 with a comparatively large inductance in seriese to the resistor 4 acts to cause the rectilinear rise of the leading portion of the charging voltage wave-form. The relation of $L >> 0.25R^2C$ is well known as to the RLC circuit for such purposes. When the gap conductance is small, the mean value of the initial discharge voltage is usually two times the mean voltage (or $2V_M$). The individual initial discharge voltages follow the Gauss distribution on both sides of the aforesaid mean value, and they are in a range of 30 volts to 400 volts. If, however, there is produced a substantial gap conductance $G$ across the discharge gap 57, it becomes difficult to generate a high voltage in excess of the power source voltage by the RLC circuit. The statistical frequency of the generation of such high voltage by such circuit also becomes smaller, as the gap conductance $G$ increases. According to another aspect of the present invention, such characteristics of the RLC circuit is used for the detection of the presence of a considerably high gap conductance.

Figure 33:
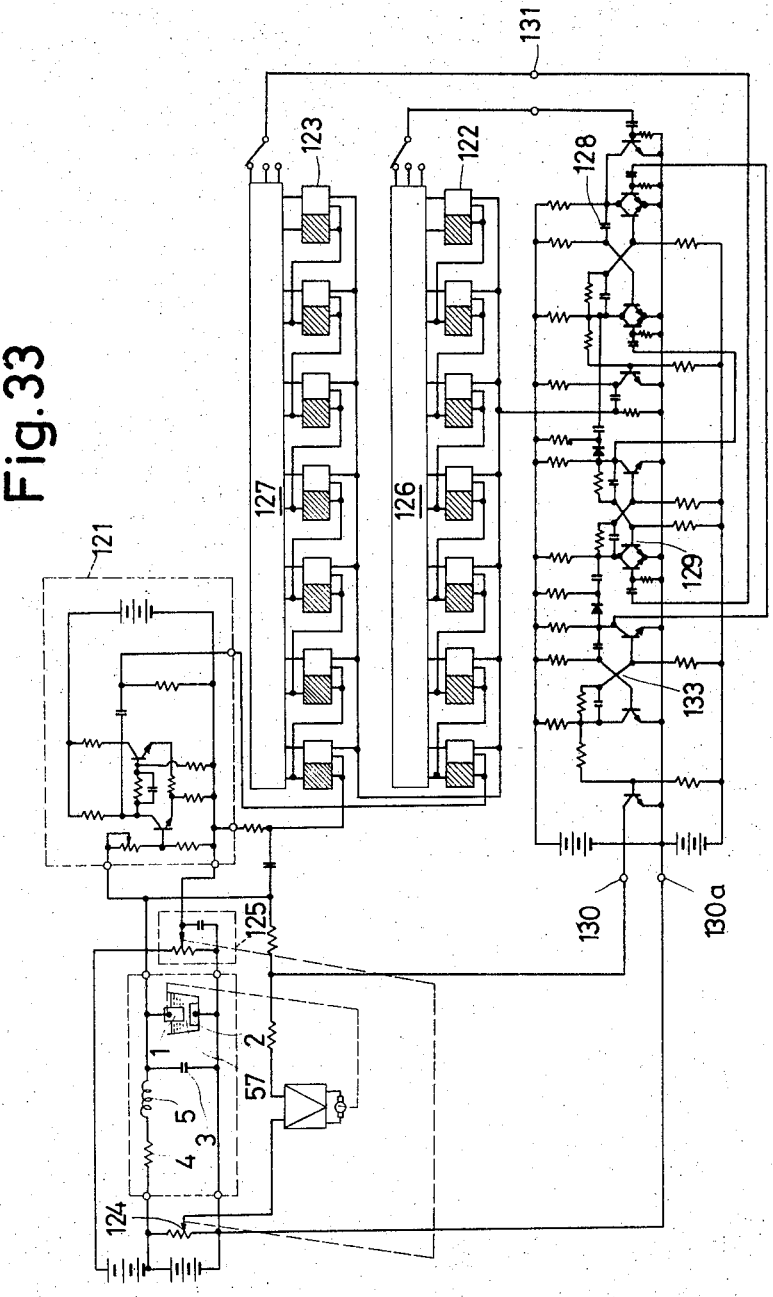
FIG. 33 is a schematic diagram of a circuit for detecting conductivity.

FIG.33 illustrates an embodiment of the present invention. As can be seen from FIG.22, the charging voltage does not exceed the normal voltage $[V_t = E/(1 + GR)]$, when the value of the gap conductance $G$ exceeds a certain given value. Thus, the waveform of the charging voltage becomes close to that of an RC charging circuit. When the charging and discharging are stable and the gap conductance $G$ is small, the probability of the chance that the charging voltage of the LRC circuit exceeds the aforesaid normal value $(V_t)$ is more than 50 percent, relative to the total number of discharges. Accordingly, in the circuit of the present invention, the set or reference voltage of a comparator 121 (a voltage comparator) is selected to be higher than the aforesaid normal voltage, and a preset counter 122 (binary system or system based on an integer $n$) counts the charging pulses in excess of the reference voltage at the comparator 121.

Another counter 123 is provided for counting all the discharges through the gap 57. Accordingly, a difference is produced between the count of all the discharges and the other count of the discharge voltages in excess of the reference voltage, which difference depends on the magnitude of the gap conductance $G$. As an extreme case, if the counter 123 counts a finite discharges but the counter 122 counts nothing, the gap conductance $G$ is considerably large.

Let it be assumed that the counter 122 counts $m$ discharge voltages of the aforesaid magnitude while the counter 123 counts $n$ discharges. Then, the gap conductance $G$ increases as the ratio $n/m$ increases. The value of the ratio $n/m$ is usually independent of the capacity of the capacitor 3 and the frequency of the charging and discharging, but it depends on the mean value of the machining voltage. Accordingly, it is desirable to change the reference voltage of the comparator 121 whenever the setting (mean value) of the machining voltage is changed. In the circuit of FIG.33, the variable resistor 124 for regulating the mean machining voltage is gang-operated with another variable resistor 125 which regulates the reference voltage of the comparator 121. In the practical circuit of FIG.33, instead of calculating the ratio $n/m$, the values of the counts $n$ and $m$ are preset in decoders 126 and 127, respectively. The value of the count $n$ is, of course, always larger than the value of the count $m$. If the normal discharge takes place, the actual count of the counter 122 first reaches the preset value $m$. At this moment, the output pulse from the decoder 126 is delivered to a monomultivibrator 128, to reset the counters 122 and 123 to zero, respectively. In this case, a flip-flop circuit 129 is not actuated, and the terminals 130 and 130a remain as insulated from each other.

Upon occurrence of a considerably large gap conductance G, the counter 123 reaches the preset value $n$ before the counter 122 reaches its preset value $m$, and an output signal is delivered to a terminal 131. Accordingly, the flip-flop circuit 129 is reversed to make the circuit between the terminals 130 and 130a. Thus, there is generated a signal to indicate the presence of a large gap conductance $G$, and the countermeasures as described above and as listed in Table VII are effected, by suitable means.

Figure 34:
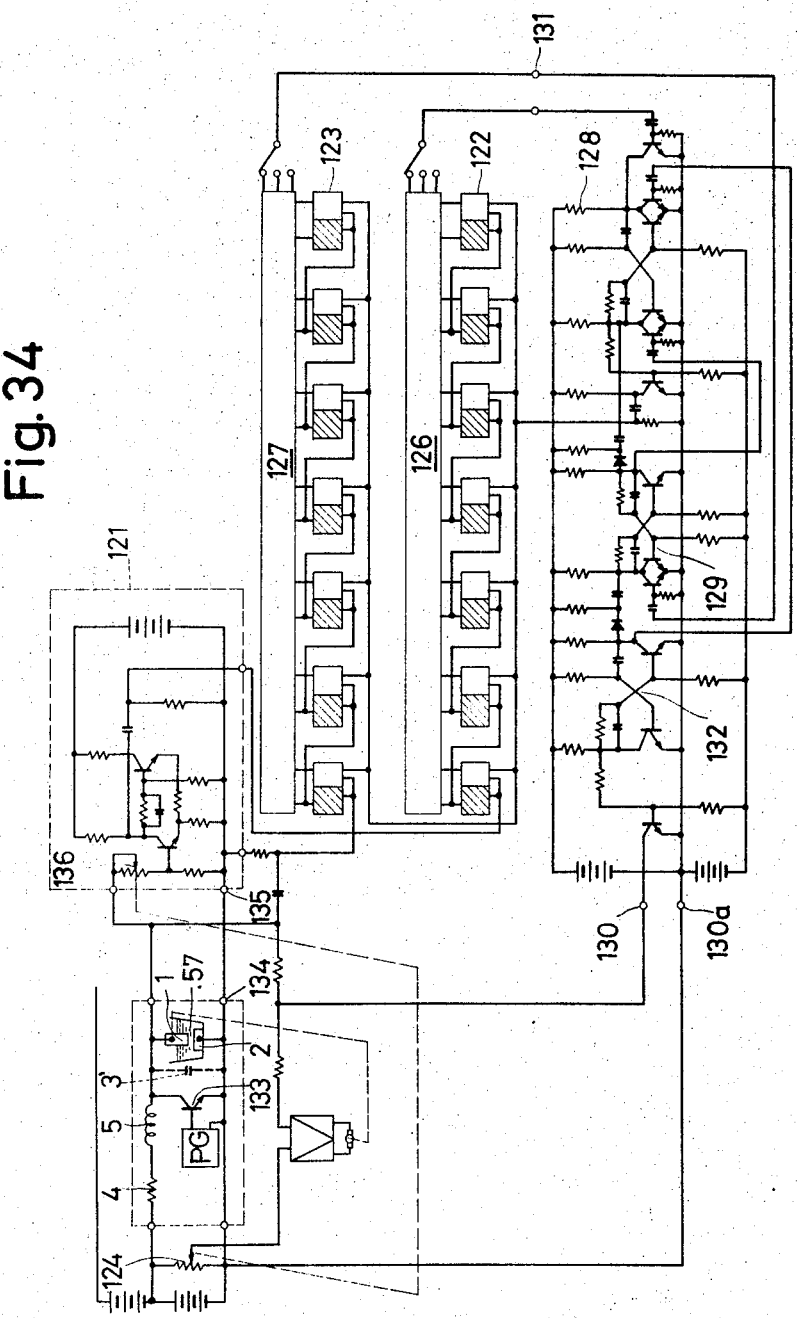
FIG. 34 is a schematic diagram of another circuit for detecting conductivity.

In the circuits of FIGS.33 and 34, after the monomultivibrator 132 acts to raise the electrode 1, relative to the workpiece 2, the counters 122 and 123 are reset together with the flip-flop circuit 129.

The circuit of FIG.34, representing another embodiment of the invention, is similar to that of FIG.33, except that an independent type switching circuit is used for a pulse generator for machining operation. If an inductor 5 is connected in series with a current-limit resistor 4 of the independent type switching circuit, there is produced a circuit consisting of a switching transistor 133 connected in parallel with the discharge gap 57 between the electrode 1 and the workpiece 2 of FIG.2, which has the RLC charging circuit. Instead of using the separate capacitor 3 in parallel with the discharge gap 57, a stray capacitance 3' across the electrode 1 and the workpiece 2 can be used, as shown in FIG.34. When the switching transistor 133 is turned off, the switching circuit behaves like as the RLC circuit.

In the circuit of FIG.34, a comparator 121 is provided with a reference voltage larger than the normal mean voltage $[V_t = E/(1 + GR)]$, and the variable resistor 125 of FIG.33 is eliminated, while connecting directly terminals 134 and 135. In order to regulate the reference voltage of the comparator 121 in response to the modification of the mean machining voltage, a variable resistor 136 is provided, which is gang-operated with another variable resistor 124 corresponding to the similarly symbolized variable resistor in FIG.33. The variable resistor 136 is incorporated for the same purposes as the resistor 125 of FIG.33.

The capacitor 3 of the RLC circuit can be replaced with any other capacity impedance, for fulfilling the objects of the present invention. The circuits of FIGS.33 and 34 can be used with a conventional RC circuit, by improving the sensitivity of the comparator 121. In this case, the reference voltage in the comparator 121 is selected at a level close to but lower than the power source voltage $E$. The inductor 5 in the circuit of FIG.34 is sometimes dispensed with, by using the stray reactance of the current-limiting resistor 4.

Although the present invention has been described with a certain degree of particularity, it is noted that the present disclosure has been made only by way of example and that various modifications in the details of construction and the combination and arrangement of parts may be resorted to without departing from the spirit and the scope of the invention as hereinafter claimed.

What is claimed is:

1. Device for machining a conductive workpiece by means of intermittent discharge of a relatively large electric pulse added to a relatively small electric pulse for insulation breaking-through to be applied across a gap between said workpiece and a movable electrode, comprising at least two means for detecting high voltage and low current of said small pulse for break-through and low output voltage and high output current of said large pulse for machining separately and independently in the discharge machining circuit, and logic circuit means for analyzing the detected values in combination to produce at least one signal representing any of normal machining condition, non-discharge condition, short circuit condition and gap conductance condition to be utilized for controlling the machining automatically.

2. Device as claimed in claim 1, including means for detecting gap conductance, and means responsive to detected conductance for withdrawing said electrode from the workpiece so as to eliminate said conductance.

3. Device as claimed in claim 1, further comprising means for superimposing high voltage pulses providing for insulation breakthrough on low voltage pulses for machining in phase, said means being adapted to produce intermittently interrupted pulses to generate $m$ pulses in every $n$ successive actuating pulses, wherein $n$ is a positive integer of at least 2 and $m$ is a positive integer of $(n - 1)$ at the most, consisting only of said low voltage pulses, and logic circuit means for subjecting to logic analysis the detected value of said intermittently lacking pulses together with said separately and independently detected values to produce a further signal representing undesirable sustained arcing condition to be utilized for controlling the machining more precisely.

4. Device as claimed in claim 1, further comprising means for superimposing high voltage pulses on low voltage pulses out of phase, and logic circuit means for subjecting to logic analysis the detected value of said resulting pulses together with said separately and independently detected values to produce a further signal representing undesirable sustained arcing condition to be utilized for controlling the machining more precisely.

5. Device as claimed in claim 4, further comprising means for narrowing the pulse width of the subsequent pulses applied across the gap in response to the detection of the undesirable arcing condition in respect to the preceding pulses.

6. Device as claimed in claim 4, further comprising means for preventing at least each one of subsequently occuring high and low voltage pulses from entering said superimposing means to form intermittently lacking pulses in response to the detection of the undesirable sustained arcing condition in respect to the preceding pulses.

7. Device as claimed in claim 4, further comprising means for lowering the maximum current value of low voltage electric pulses for machining in response to the detection of the undesirable sustained arcing condition in respect to the preceding pulses.

8. Device as claimed in claim 1, further comprising means for counting the number of discharges per unit of time only during the normal machining condition to be detected by said logic circuit means, means for determining an electrode feed during said unit time period, and means for subjecting to logic analysis the value of said determined electrode feed to produce a further signal of the value as a function of the effective area of the electrode to be utilized for controlling the machining more precisely.

9. Device as claimed in claim 8, in which any of the maximum value of peak pulse current and the duty factor thereof is automatically determined depending on said electrode area function value.

* * * * *